United States Patent
Bhasin et al.

(10) Patent No.: US 9,735,663 B2
(45) Date of Patent: Aug. 15, 2017

(54) BJT DRIVE SCHEME

(71) Applicant: Power Integrations, Inc., San Jose, CA (US)

(72) Inventors: Manoj Bhasin, Cambridge (GB); Antonius Jacobus Johannes Werner, Cambridge (GB); Paul Ryan, Cambridgeshire (GB); Johan Piper, Cambridge (GB)

(73) Assignee: Power Integrations, Inc., San Jose, CA (US)

( * ) Notice: Subject to any disclaimer, the term of this patent is extended or adjusted under 35 U.S.C. 154(b) by 482 days.

(21) Appl. No.: 14/504,124

(22) Filed: Oct. 1, 2014

(65) Prior Publication Data

US 2015/0016151 A1    Jan. 15, 2015

Related U.S. Application Data

(63) Continuation-in-part of application No. 14/184,073, filed on Feb. 19, 2014, now Pat. No. 9,531,264.
(Continued)

(51) Int. Cl.
*H02M 1/08* (2006.01)
*H02M 1/36* (2007.01)
(Continued)

(52) U.S. Cl.
CPC ............... *H02M 1/08* (2013.01); *H02M 1/36* (2013.01); *H02M 3/156* (2013.01); *H02M 3/335* (2013.01); *H02M 2001/0006* (2013.01)

(58) Field of Classification Search
CPC .......... H02M 1/08; H02M 1/36; H02M 3/335; H02M 2001/0006; H02M 3/156
(Continued)

(56) References Cited

U.S. PATENT DOCUMENTS 5,841,641 A * 11/1998 Faulk ................... H02M 3/335
                                                         363/21.14
5,859,524 A    1/1999 Ettes
(Continued)

OTHER PUBLICATIONS

"THX [Switching Power Controller IC] Datasheet", [online]. [archived Feb. 21, 2014]. Retrieved from the Internet: <URL: https://web.archive.org/web/20140101000000*/http://www.bbs.dianyuan.com/bbs/u/55/1330441183681758.pdf>, (2014), 1-21.
(Continued)

*Primary Examiner* — Jared Fureman
*Assistant Examiner* — Michael Warmflash
(74) *Attorney, Agent, or Firm* — Christensen O'Connor; Johnson Kindness PLLC

(57) ABSTRACT

The invention generally relates to switch mode power converters (SMPCs). and methods for providing supplementary base drive to a bipolar transistor of an SMPC, and more particularly to a switching control circuit for a SMPC, a said SMPC having an inductive component coupled to receive power from an input to the SMPC, a bipolar transistor coupled to control current flow in the inductive component, an auxiliary power rail, a charge store for supplying power via the auxiliary rail to a switching control circuit for driving the bipolar transistor, and a bootstrap circuit for bleeding current from the input to the bipolar transistor to thereby provide an amplified current to the charge store, the switching control circuit comprising: a base current line for coupling to a base terminal of a said bipolar transistor, an emitter current line for coupling to an emitter terminal of a said bipolar transistor, an auxiliary line for coupling to a said auxiliary power rail, and at least one reference line for coupling to a reference voltage; a base current switch configured to controllably couple a base current source to the base current line; an emitter current switch configured to controllably couple the emitter current line to a said refer-
(Continued)

ence line; a bootstrap element for bleeding current from the emitter current line to the auxiliary line, the bootstrap element further operable to block a said current according to a current or voltage bias; a base discharge switch configured to controllably bleed current from the base current line to a said reference line; and a supplementary base drive line for coupling to a series circuit comprising a supplementary base drive resistor and current control element coupled in series, a said series circuit for bleeding current from a said input to a said base terminal, a said current control element for blocking current flow from a said bootstrap circuit to a said supplementary base drive resistor.

17 Claims, 10 Drawing Sheets

Related U.S. Application Data

(60) Provisional application No. 61/767,023, filed on Feb. 20, 2013, provisional application No. 61/888,778, filed on Oct. 9, 2013.

(51) Int. Cl.
  *H02M 3/156* (2006.01)
  *H02M 1/00* (2006.01)
  *H02M 3/335* (2006.01)

(58) Field of Classification Search
  USPC .......................................................... 307/23
  See application file for complete search history.

(56) References Cited

U.S. PATENT DOCUMENTS

| | | | |
|---|---|---|---|
| 7,636,246 B2 | 12/2009 | Huynh et al. | |
| 9,531,264 B2* | 12/2016 | Ryan | H02M 3/156 |
| 2002/0130645 A1* | 9/2002 | Tsai | G05F 1/24 |
| | | | 323/274 |
| 2007/0030704 A1* | 2/2007 | Ramabhadran | H02M 3/33507 |
| | | | 363/21.01 |
| 2010/0165671 A1* | 7/2010 | Coulson | H01F 27/324 |
| | | | 363/21.12 |
| 2010/0309689 A1* | 12/2010 | Coulson | H02M 3/33507 |
| | | | 363/16 |
| 2011/0101952 A1 | 5/2011 | Lee | |
| 2013/0214757 A1* | 8/2013 | Lee | H03K 17/06 |
| | | | 323/311 |
| 2014/0232187 A1 | 8/2014 | Ryan et al. | |

OTHER PUBLICATIONS

"UCC28610—Green-Mode Flyback Controller Datasheet", (c) 2012 Texas Instruments, (2012), 41 pgs.
Hu, Chenming, "Chapter 8: Bipolar Transistor, in: Modern Semiconducor Devices for Integrated Circuits", [online]. [retrieved on Feb. 13, 2009]. Retrieved from the Internet: <URL: http://www.eecs.berkeley.edu/~hu/Chenming-Hu_ch8.pdf>, (2009), 291-323.
Van Zeghbroeck, B. J., "Chapter 5: Bipolar Junction Transistors", In: Principles of Semiconductor Devices [online]. [retrieved on Feb. 20, 2014]. Retrieved from the Internet: <URL: http://ecee.colorado.edu/~bart/book/book/chapter5/ch5_6.htm>, (Dec. 2004), 1-6.
"AP3776 Advance Datasheet: Low Power Off-line Primary Side Regulation Controller", BCD Semiconductor Manufacturing Limited, Rev. 1.3, Sep. 2013, 14 pages.
PRC (China) First Office Action with English Translation, issued May 18, 2017, for Chinese Application No. 201410057906.7, dated Feb. 20, 2014, 17 pages.

* cited by examiner

BJT DRIVE SCHEME

RELATED APPLICATIONS

This application is a continuation-in-part of U.S. application Ser. No. 14/184,073, filed Feb. 19, 2014, which application claims priority under 35 U.S.C. §119(e) to U.S. Provisional Application No. 61/767,023, filed Feb. 20, 2013; and to U.S. Provisional Application No. 61/888,778, filed Oct. 9, 2013, which applications are incorporated herein by reference in their entirety.

FIELD OF THE INVENTION

The present invention generally relates to switch mode power converters (SMPCs) and methods for providing supplementary base drive to a bipolar transistor of an SMPC, and more particularly to a switching control circuit for a SMPC.

BACKGROUND TO THE INVENTION

The use of a low cost bipolar junction transistor (BJT) for the primary switch in an offline power converter is desirable, since it provides both high breakdown voltage and low on-state voltage. However, a bipolar junction transistor generally requires a relatively high drive current and this may give rise to disadvantages for example in relation to power dissipation.

There therefore remains a need for an improved drive scheme for a primary switch such as a BJT, for example in a converter that is off-line and/or has primary side sensing. Such need may relate to, inter alia, cost, converter output power capability/rating and/or reliability, preferably in a drive scheme addressing a wide range of bipolar transistors, etc. Furthermore, a drive scheme that may be implemented with existing SMPCs and/or SMPC controllers is desirable, for example where the existing SMPCs and/or controller may be adapted to allow higher converter output power operation and/or use of a generally cheaper bipolar primary transistor having lower current gain.

A further disadvantage suffered by the BJT when compared to a voltage-controlled MOSFET, IGBT, etc., is the comparatively large reservoir of charge needed during the start-up procedure. Typically a reservoir capacitor $C_{Aux}$ is charged from the rectified mains input to an initialisation voltage; it then provides all of the charge, as an auxiliary supply, to both power the IC controller and drive the BJT, until a bias winding voltage rises sufficiently to take over these roles. If the initialisation charge in $C_{Aux}$ does not power the IC and BJT for long enough to raise the bias winding voltage to its operational level, the power converter will fail to start. Loads having a high input capacitance are a particular challenge, as they present an effective short circuit in a 'cold start' situation; more switching cycles are therefore required to raise the output and bias winding voltages. A BJT requires significantly more charge to turn on than does a voltage-controlled device, so the charge reservoir runs down more quickly. A larger reservoir capacitance requires a higher start-up current, which can increase power consumption. Operating with a higher reservoir voltage provides more charge to support start-up for a given reservoir capacitance, and also provides more headroom for driving devices in the IC. However it also increases power consumption due to dissipation losses.

Other operating conditions may similarly raise technical issues. The bias winding voltage is generally closely related to the converter output voltage, so when the output voltage is low there may be insufficient controller IC bias power. This may occur, for converters operating in constant current or constant power output modes, when a low impedance load causes the output voltage to drop. Although this problem does occur for MOSFET-based converters, the large current required by a BJT exacerbates it considerably.

Thus, with regard to an offline power converter employing for example a BJT as primary switch, improvements are desired in relation to efficient operation and/or generally in relation the effective supply of charge to the controller IC by conventional means.

In view of the above, the field of SMPCs continues to provide a need for improved control over the supply of operating current to IC controllers of power converters, for example cascode power converters comprising bipolar or field effect primary switches.

For use in understanding the present invention, the following disclosures are referred to:
- U.S. Pat. No. 7,636,246 (Inventors Huynh et al, assignee Active-Semi, Inc.), corresponding to US20070891397 published Feb. 12, 2009;
- UCC28610 datasheet, available from Texas Instruments at http://www.ti.com/product/ucc28610; and
- THX202H datasheet, available from: http://bbs.dianyuan.com/bbs/u/55/1330441183681758.pdf;

SUMMARY

According to a first aspect of the present invention, there is provided a switching control circuit for a switch mode power converter (SMPC), a said SMPC having an inductive component having a winding coupled to receive power from an input to the SMPC, a bipolar transistor coupled to control current flow in the winding, an auxiliary power rail, a charge store for supplying power via the auxiliary rail to a switching control circuit for driving the bipolar transistor, and a bootstrap circuit for bleeding current from the input to the bipolar transistor to thereby provide an amplified current to the charge store, the switching control circuit comprising: a base current line for coupling to a base terminal of a said bipolar transistor, an emitter current line for coupling to an emitter terminal of a said bipolar transistor, an auxiliary line for coupling to a said auxiliary power rail, and at least one reference line for coupling to a reference voltage; a base current switch configured to controllably couple a base current source to the base current line; an emitter current switch configured to controllably couple the emitter current line to a said reference line; a bootstrap element for bleeding current from the emitter current line to the auxiliary line, the bootstrap element further operable to block a said current according to a current or voltage bias; a base discharge switch configured to controllably bleed current from the base current line to a said reference line; and a supplementary base drive line for coupling to a series circuit comprising a supplementary base drive resistor and current control element coupled in series, a said series circuit for bleeding current from a said input to a said base terminal, a said current control element for blocking current flow from a said bootstrap circuit to a said supplementary base drive resistor.

In an embodiment, the bleeding of current, by the series circuit, from a said input (which may for embodiments be referred to as, e.g., Vin) may bleed the current indirectly such as via a said auxiliary rail receiving power transferred inductively from the input, e.g., via an auxiliary winding on the inductive component of the SMPC.

An embodiment advantageously may allow the switching control circuit to operate in a high power rating SMPC without overheating, since supplementary base drive may be provided to the bipolar transistor through a current path external to the switching control circuit, e.g., through a series circuit having the supplementary base drive resistor. This may be desirable for example where the switching control circuit is a converter controller integrated chip (IC) having a maximum output base current rating due to the maximum power dissipation thermal characteristics of the packaged IC. Surprisingly, provision of the series circuit generally does not impair power regulation or power efficiency in an embodiment. For example, while current may continuously flow through the series circuit, the switch $Q_{BG}$ may be operated to route this current to a reference voltage (e.g., ground) and thus away from the primary switch base when the primary switch is not to be controlled on. Additionally or alternatively, the timings of switching the bipolar transistor may still be optimised to reduce base discharge time and/or avoid saturation of the bipolar transistor.

Preferably, in an embodiment the current control element may substantially prevent current derived from the input (e.g., received from a start-up diode connected to the input) being diverted away from the bipolar transistor into the series circuit and thus not becoming amplified and subsequently passing through the bootstrap element. Thus, provision of the series circuit need not impair charging of the charge store during start-up.

There may further be provided the switching control circuit, comprising at least one of the said supplementary base drive resistor and current control element, e.g., diode or switch, coupled to the supplementary base drive line. Thus, the switching control circuit may be supplied with or without any or all components of the series circuit, e.g., with none, either or both of the supplementary base drive resistor and current control element (e.g., diode or switch). It is noted that 'supplementary' base drive line does not necessarily indicate an additional line, e.g., dedicated pin on a switching control circuit IC ('supplementary' referring rather to additional base current). However, there may further be provided the switching control circuit, wherein the supplementary base drive line is additional to the base current line.

There may further be provided the switching control circuit, having a package comprising an integrated circuit having the switching control circuit, and comprising at least a said supplementary base drive resistor of a said series circuit, wherein at least the supplementary base drive resistor is external to the package. (The switching control circuit may be on an IC housed in a package, e.g., an 8-pin SOT23. Such a package may have a pin for connection to the external resistor). The switching control circuit may be alternatively not be on an IC but preferably at least provided in a single package. Regardless, the external part/whole of the series circuit may shift power dissipation away from the packaged circuit.

There may further be provided the switching control circuit, wherein the current control element comprises a diode for performing said blocking when a said voltage bias reverse-biases the diode. Thus, the afore-mentioned voltage bias may be a reverse or forward bias voltage across the diode. The diode may be external or internal to a package housing the switching control circuit, e.g., may be provided on an IC having the circuit. Preferably however the supplementary base drive resistor remains external to such a package.

There may further be provided the switching control circuit, wherein the current control element comprises a supplementary base drive switch configured to receive the current or voltage bias as a control signal, the supplementary base drive switch controllable to performing said blocking according to the control signal. Thus, a supplementary base drive switch may be additional or, more preferably, alternative to the above-mentioned a blocking diode. Preferably, the switching control circuit is configured to synchronise switching of the base current switch and the supplementary base drive switch to turn on simultaneously to allow current flow to the base line. More preferably, the switching control circuit is configured to control timing of switching both the base current switch and the supplementary base drive switch based on monitoring the SMPC, preferably wherein said monitoring comprises monitoring a voltage or current signal on the auxiliary power rail and/or on a terminal (e.g., base, emitter or collector) of a said bipolar transistor, the switching control circuit thereby operable to regulate output power from a said SMPC with reduced power dissipation relating to base charge storage of the transistor, e.g., preferably controlling size and/or duration of base current to achieve a target turn-on and/or turn-off time of the transistor.

In a preferred mode of operation, an embodiment may additionally provide power for the switching control circuit (e.g., converter controller IC) during a switching cycle of the bipolar transistor. This may be referred to as 'aux recharge'. More specifically, a preferred embodiment having a relatively minimal arrangement may achieve auxiliary recharge, using an arrangement preferably comprising: a cascode converter with a switched connection (bootstrap element, e.g., diode or controlled switch) from the bipolar transistor emitter to an auxiliary power rail line and a switched connection (e.g., second transistor) from BJT emitter to a reference line such as ground, the latter to be opened while the BJT is conducting to provide current through the former.

Such an embodiment may provide an alternative or additional means for maintaining sufficient power to the switching control circuit, preferably regardless of output voltage and/or load of the SMPC, which is preferably a cascode power converter. This may be achieved in an embodiment by using BJT emitter current to provide power for a converter controller IC during a switching cycle, for example during normal (e.g., PWM-controlled) operation, i.e., when the SMPC is providing power to the load, after a start-up of period the SMPC.

More generally, to allow auxiliary recharge, there may further be provided the switching control circuit, comprising a charging circuit for supplying charge to the charge store for providing power to a switching controller of an afore-mentioned SMPC, the SMPC comprising: the inductive component having the winding coupled to receive power from an input to said SMPC; a switching circuit comprising first and second switching transistors, said first transistor coupled in series between said winding and said second transistor and to receive a winding current wherein said winding current is a current derived from said winding; a switching controller to control switching of said second transistor; and a charge store coupled to provide power to said switching controller, the charging circuit comprising: a current diversion circuit to conduct a said winding current from the first transistor to said charge store; and said second transistor arranged to controllably decouple a reference voltage line from said current diversion circuit to allow said winding current to flow through said current diversion circuit to said charge store. Preferably the switching controller comprises such a switching control circuit, and/or the first and second transistors are the afore-mentioned bipolar transistor and emitter current switch. The current diversion circuit preferably comprises the bootstrap element and/or the reference voltage line is a said afore-mentioned reference line ('line' being, e.g., electrically conductive wire, track, and/or pin or other terminal connector element).

There may be provided a switch mode power converter (SMPC) comprising the switching control circuit of any preceding claim, wherein the SMPC is for example a flyback, forward or boost converter.

According to another aspect of the present invention, there is provided a method of providing supplementary base drive to a bipolar transistor of a switch mode power converter (SMPC), a said SMPC having an inductive component having a winding coupled to receive power from an input to the SMPC, a bipolar transistor coupled to control current flow in the winding, an auxiliary power rail, a charge store for supplying power via the auxiliary power rail to a switching controller having a base current switch to control current drive to the bipolar transistor, and a bootstrap circuit for bleeding current from the input to the bipolar transistor to thereby provide an amplified current to the charge store, the SMPC having a series circuit comprising a supplementary base drive resistor and a supplementary base drive switch coupled in series, the series circuit for bleeding current from a said input to a base terminal of the bipolar transistor, the supplementary base drive switch for blocking current flow from a said bootstrap circuit to the supplementary base drive resistor, the method comprising: turning the base current switch on to allow base current to pass to the bipolar transistor throughout an on time period; and driving the supplementary base drive switch on for at least part of the on time period, to thereby supplement the base current to thereby drive the bipolar transistor on.

Similarly as for the first aspect, the bleeding of current, by the series circuit, from the input may bleed the current indirectly such as via a said auxiliary rail receiving power transferred inductively from the input, e.g., via an auxiliary winding on the inductive component of the SMPC.

Preferably, the bootstrap circuit comprises a resistor (Rstartup) coupled between the SMPC input and the bipolar transistor base, the bipolar transistor and a switch or diode between the base and auxiliary power rail, thus allowing the charge store to be charged at start-up using a current amplified by the bipolar transistor.

An embodiment may be provided using a switching control circuit IC having the supplementary base drive switch coupled to a supplementary base drive pin on the IC, this preferably lowering component count and/or cost.

Similarly as for an embodiment of the first aspect, an embodiment optimised operation with regard to switching behaviour of the primary transistor may be achieved. Preferably, the base current switch and supplementary base drive switch turn on and off simultaneously, i.e., their switching instants are substantially (e.g., exactly) coincident. In this case, timing of controlling switching on/off of the base current switch to drive the bipolar transistor does not need to be altered with regard to, e.g., reducing saturation of the bipolar transistor and/or improving power efficiency (such timing preferably based on monitoring for example using comparison to a target turn-off and/or turn-on time of the bipolar transistor). A method of controlling timing of switching the base current switch may simply be extended to control the supplementary base drive switch in preferably perfect synchronism.

Further advantageously, an embodiment may control voltage on the auxiliary power rail preferably such that the voltage does not exceed a desired maximum, e.g., a maximum supply voltage rating of the switching control circuit.

Thus, there may for example be provided the method comprising: controlling the bipolar transistor off throughout an off time period; and driving the supplementary base drive switch on for at least part of the off time period, to allow current flow from the auxiliary power rail through the supplementary base current resistor to thereby reduce voltage on the auxiliary power rail.

Such an off time period may comprise a time period referred to as a discharge time ('Dchg') and may further comprise optional ring and/or idle time periods. Generally, the off time period extends from then the bipolar transistor collector current is being substantially stopped (e.g., reduced to 10% or less of the on current) to when the bipolar transistor receives a bias/signal to turn on again.

There may further be provided the method, comprising monitoring voltage on the auxiliary power rail, and comprising: enabling said driving the supplementary base drive switch on for at least part of the off time period, when voltage on the auxiliary power rail is above a threshold voltage such as e.g., 10, 12, 15, 15.5V, 16V or 20V, e.g., when the voltage reaches or exceeds the threshold. (Thus, the driving may be enabled during only part of, or at least part of, the full off time period, the part being when the voltage on the auxiliary power rail is above such a threshold voltage). Such monitoring may be performed by the switching control circuit.

There may further be provided the method, comprising inhibiting said driving the supplementary base drive switch on for at least part of the off time period, when voltage on the auxiliary power rail is below a threshold voltage such as e.g., 10, 12, 15, 15.5V, 16V or 20V, e.g., when the voltage has not yet reached or becomes less than the threshold. (Thus, the driving may be enabled during only part of, or at least part of, the full off time period, the part being when the voltage on the auxiliary power rail is below such a threshold voltage). This may be the case at during start-up of the converter, for example.

To allow auxiliary recharge, there may further be provided the method, comprising a method of providing power to a switching controller of the switch mode power converter (SMPC), the SMPC having: the inductive component having the winding coupled to receive power from the input to said SMPC; a switching circuit comprising first and second switching transistors, said first transistor coupled in series between said winding and said second transistor; the switching controller to control switching of said second transistor; and the charge store to provide power to said switching controller, the method comprising: establishing a flow of current from said winding through said first transistor; and diverting said current through a conduction path to said charge store. Preferably the switching controller comprises a switching control circuit as mentioned above, and/or the first and second transistors are the afore-mentioned bipolar transistor and emitter current switch. The conduction path preferably comprises the bootstrap element and/or the reference voltage line is a said afore-mentioned reference line (line being, e.g., electrically conductive wire, track, and/or pin or other terminal connector element).

Preferred embodiments are defined in the appended dependent claims.

Any one or more of the above aspects and/or any one or more of the above optional features of the preferred embodiments may be combined, in any permutation.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

An embodiment implementing supplementary base drive may allow a controller, which is for controlling switching of the primary switch of a converter using base and emitter drive for the switch control, to be used in higher power rating converters and/or with a lower gain primary switch. To reduce power dissipation in the controller IC, the embodiment supports base current from the auxiliary power circuit via a series circuit (e.g., resistor and diode connection) to supply supplementary base current from the auxiliary rail to the primary switch.

In a preferred embodiment, the series circuit may have a supplementary base drive (SBD) switch in the series circuit, the switch preferably inside and coupled to an external pin of a switching control circuit package. This SBD switch may be controlled to only turn on when the primary switch is being driven on (in a 'Chg' period). In an embodiment, a resistor of the series circuit, which resistor is external to the controller IC, may dictate the supplementary base current. Power may be dissipated in this resistor rather than in the controller. Nevertheless, the control of the primary switch by the controller is advantageously not degraded in an embodiment, for example where the controller monitors the primary switch to determine a duration or size of base current in a later cycle.

Figure 7A:
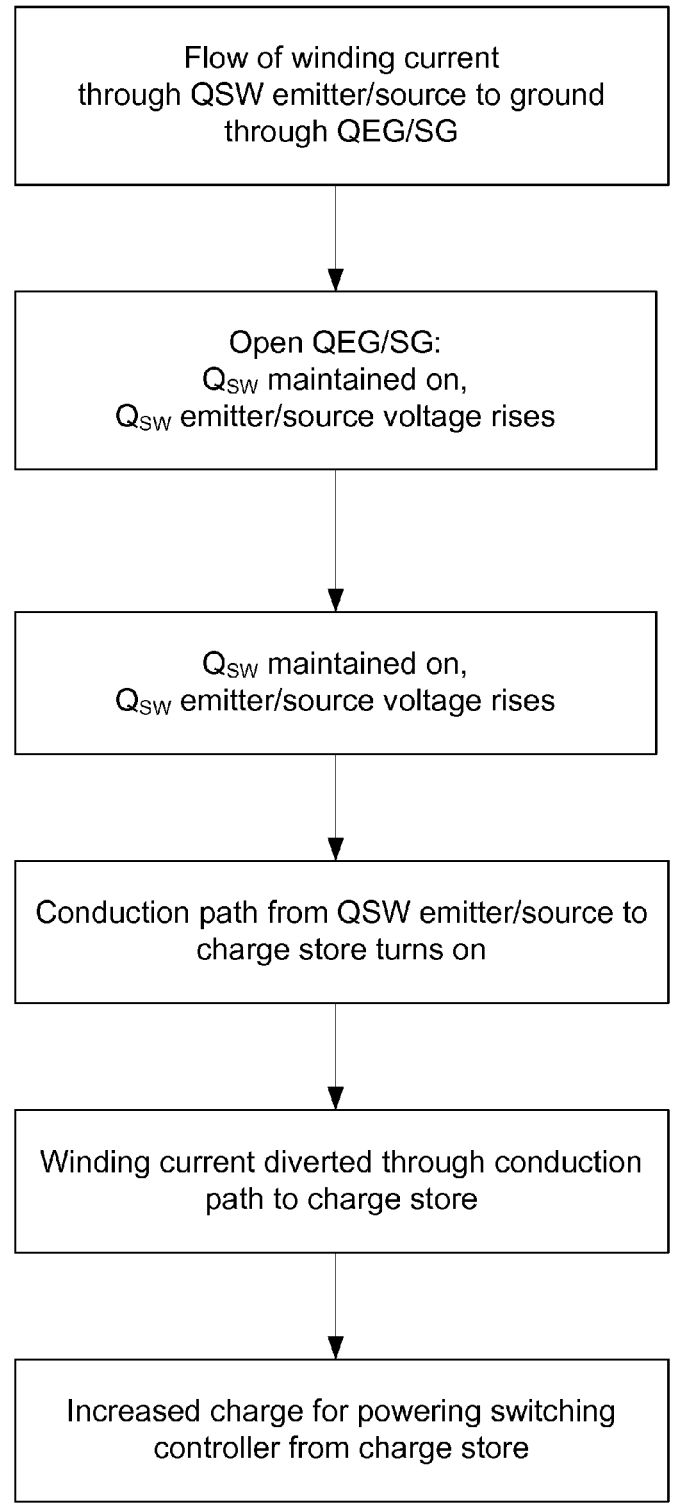
FIG. 7a shows a flow diagram of a control method for auxiliary recharge.
Figure 7B:
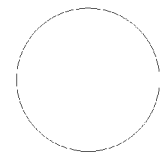
FIG. 7b shows a disc carrying code for controlling the switches of an embodiment to enable the provision of power to the charge store.
Figure 8:
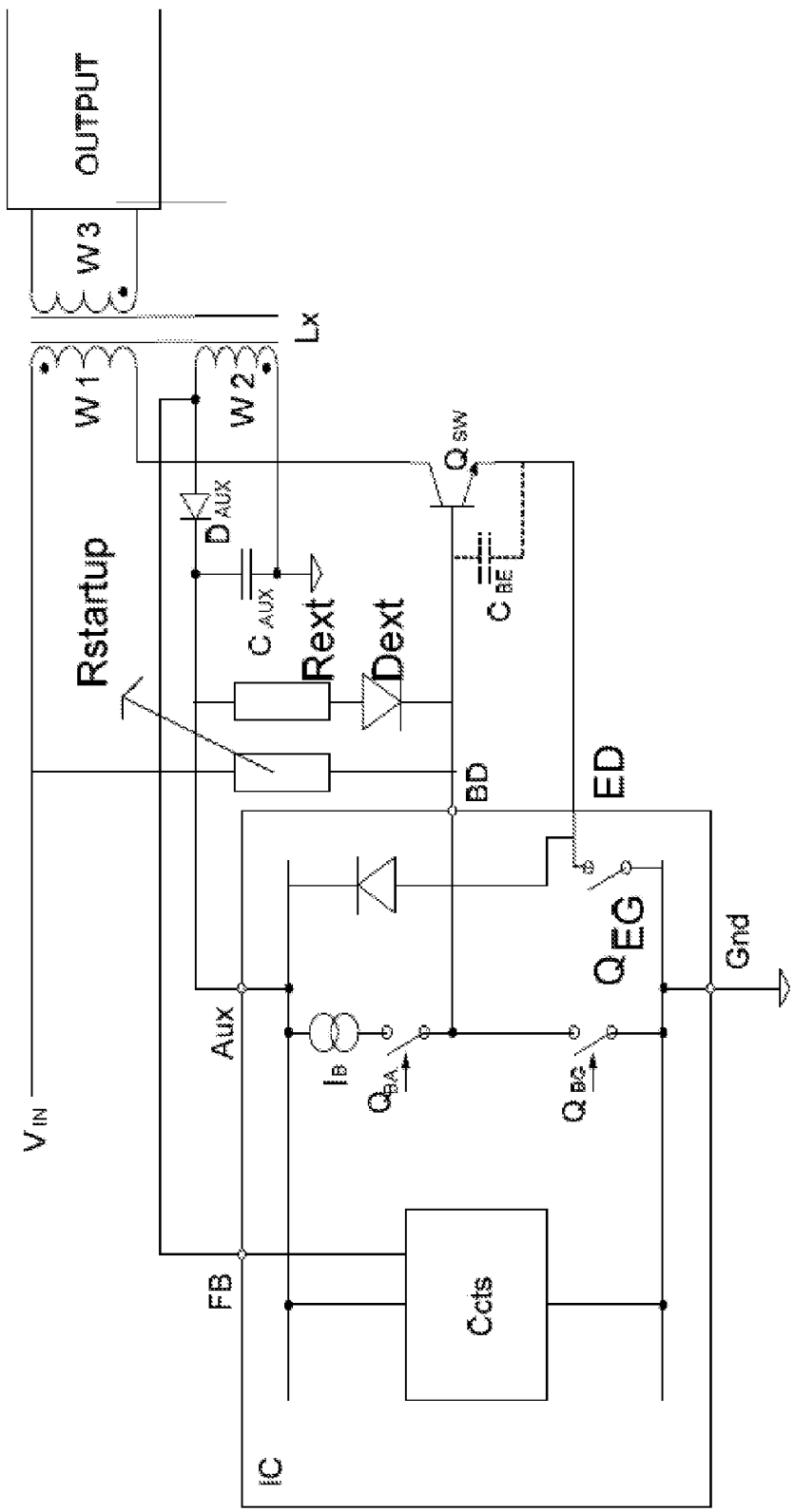
FIG. 8 shows a circuit schematic of a supplementary base drive embodiment having a first approach to supplement base drive to the primary switch.
Figure 9:
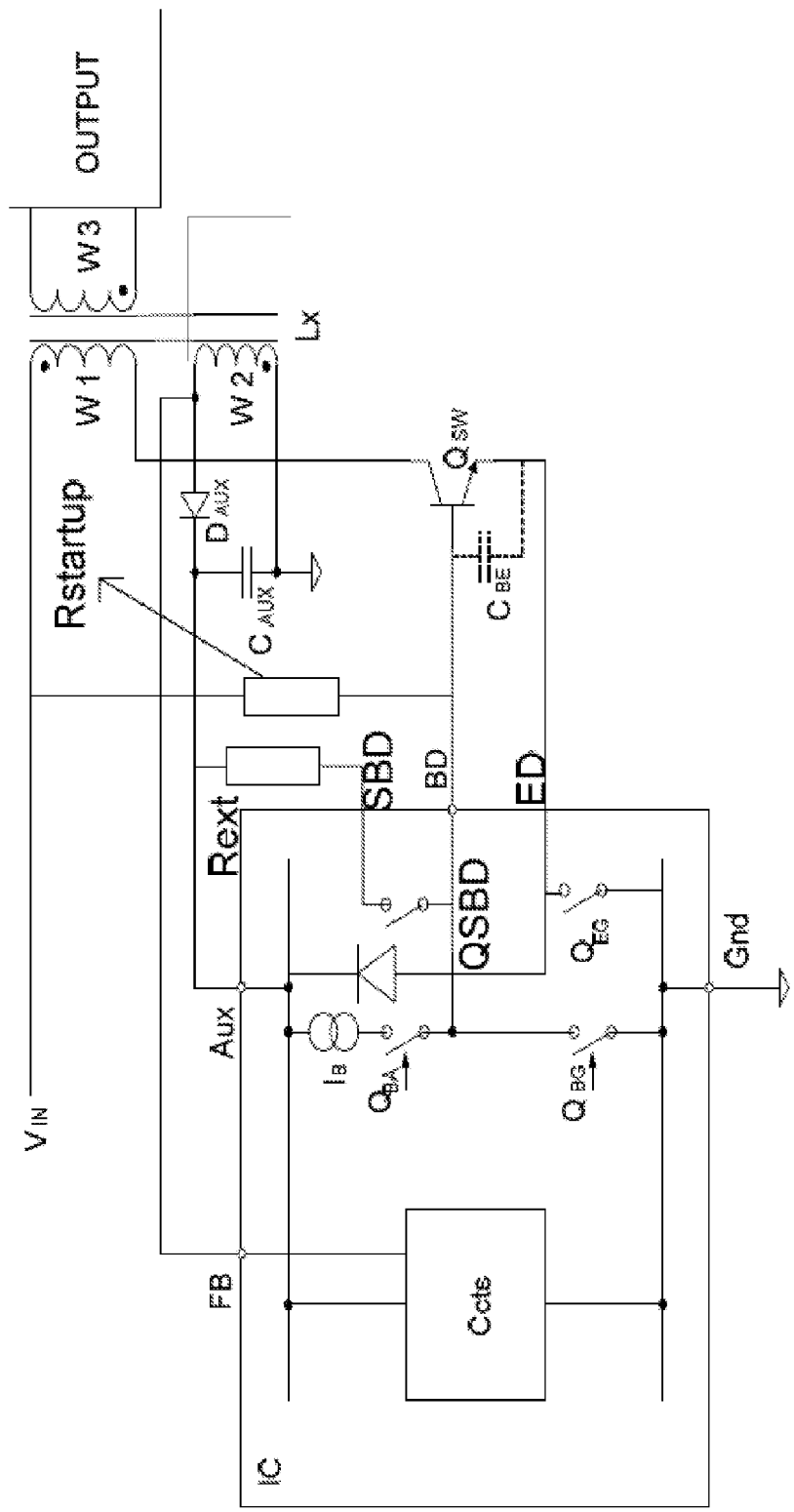
FIG. 9 shows a circuit schematic of a supplementary base drive embodiment having a second approach to supplement base drive to the primary switch.
Figure 10:
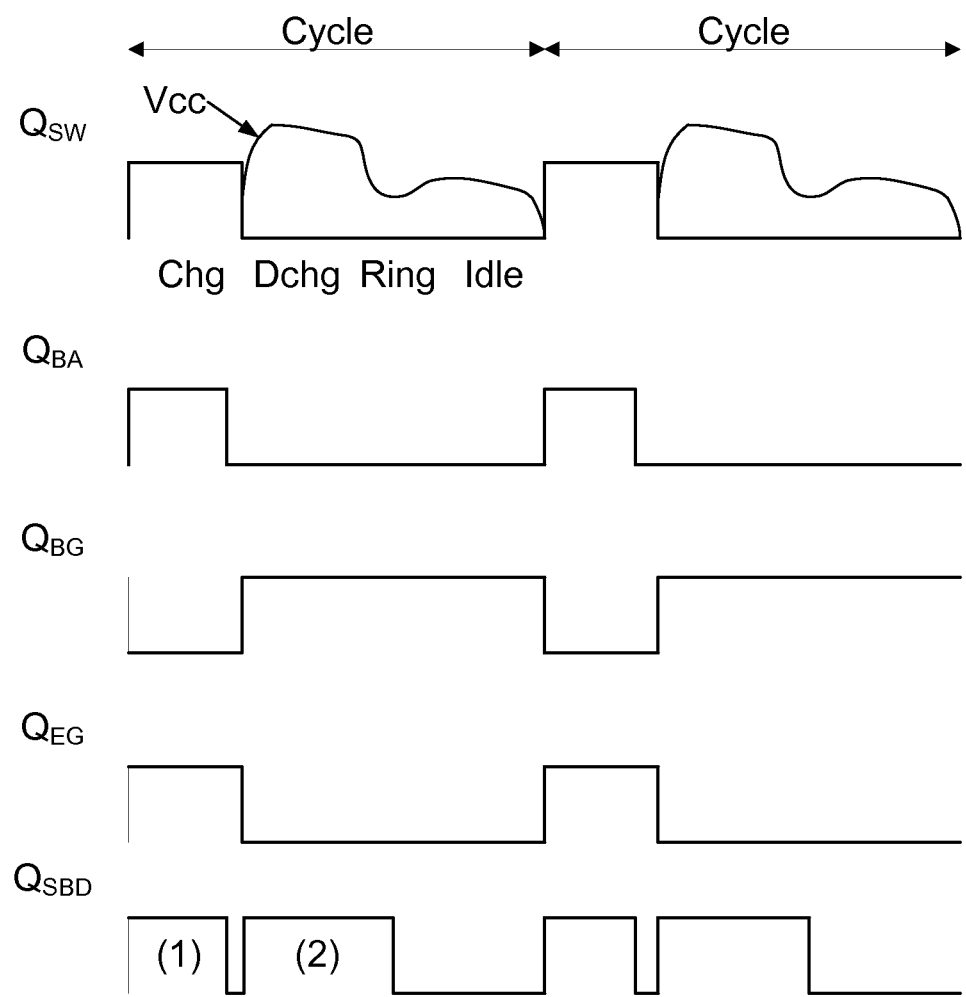
FIG. 10 shows a timing diagram for switching in a supplementary base drive embodiment having the second approach.

FIGS. 8 and 9 show two example supplementary base drive configurations having the series circuit. As can be seen clearly from the drawings, a switching arrangement in common with both configurations, optionally using switching timings as shown in FIG. 10, is closely related to configurations for auxiliary recharge (see FIGS. 1-7) and thus supplementary base drive may be provided in conjunction with auxiliary recharge operation.

We describe firstly Auxiliary Recharge, before considering specifically Supplementary Base Drive.

Auxiliary Recharge

An auxiliary recharge embodiment with or without supplementary base drive uses BJT emitter (or MOSFET source where SBD is not required) current to provide power for the converter controller IC during a switching cycle. More specifically, a preferred embodiment having a relatively minimal arrangement for achieving auxiliary recharge comprises: a cascode converter with a switched connection from BJT emitter or MOSFET source to an auxiliary charging line and a switched connection from BJT emitter or MOSFET source to 'ground', the latter to be opened while the BJT or MOSFET is conducting to provide current through the former.

Preferably, an embodiment supplies operating current to a switching controller by a complementary means from the conventional 'Aux winding'.

Figure 1:
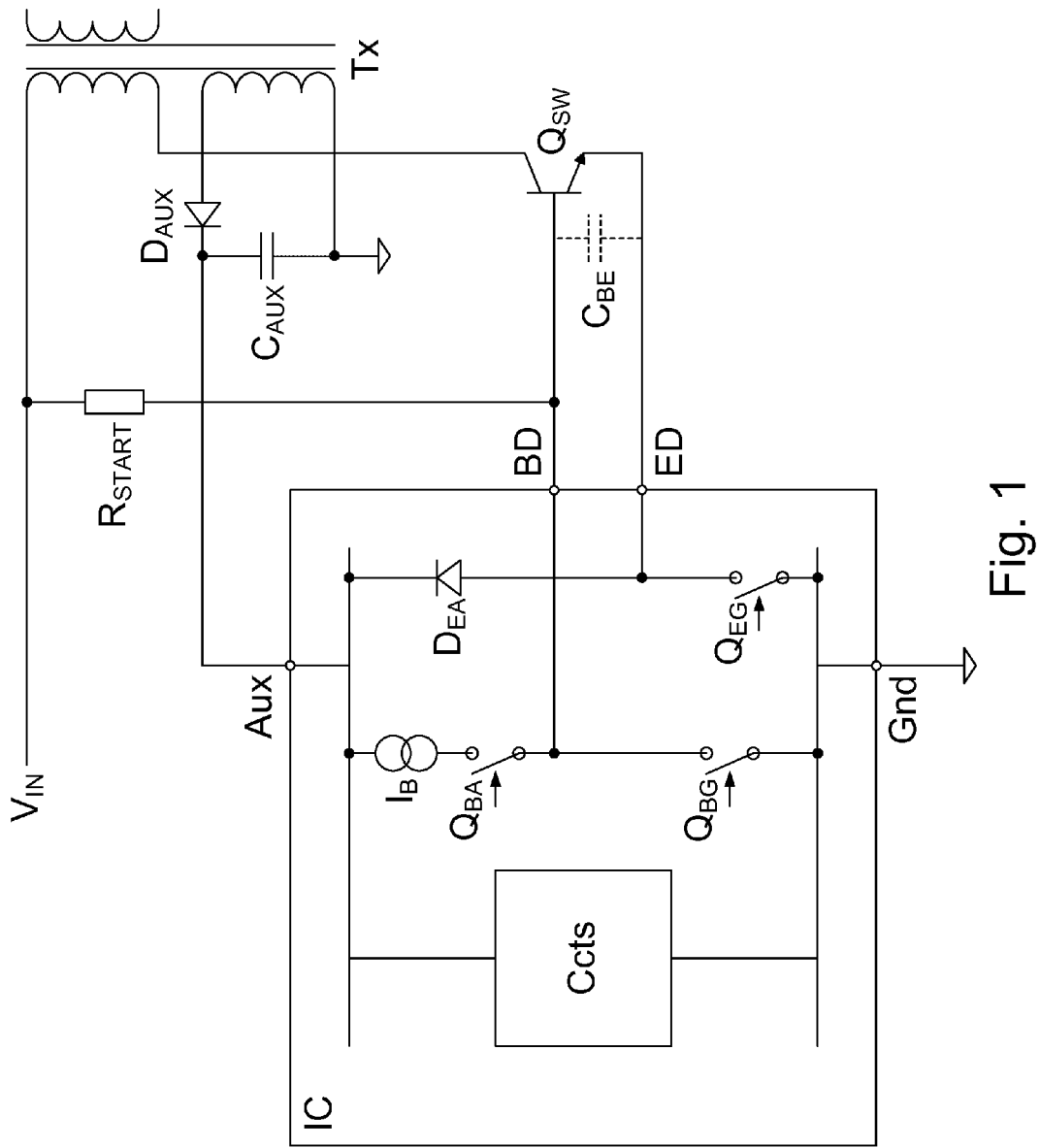
FIG. 1 shows a first circuit schematic for auxiliary recharge.

FIG. 1 shows a circuit schematic of a first embodiment for auxiliary recharge. The offline power converter may be of any type, for example flyback, boost or forward converter, and is shown here merely by way of example as a single-ended design. Whilst a transformer Tx is illustrated in FIG. 1, alternative inductive components may be employed, depending on the converter type and the nature of the application. For example a flyback converter may employ a coupled inductor, and a boost converter may employ an inductor. Some or all of switches $Q_{BA}$, $Q_{BG}$ and $Q_{EG}$, and diode $D_{EA}$, may be integrated into an IC Controller, as illustrated in FIG. 1. This approach may minimise the overall parts count for a power converter. Alternatively some or all of these devices may be discrete components, for example in order to reduce power dissipation in, and/or the die size of, the IC. They may be formed in any appropriate manufacturing process. Connection between the ED and Aux terminals may be provided by a controllable switch $Q_{EA}$ rather than by diode $D_{EA}$. Switches $Q_{BA}$, $Q_{BG}$ and $Q_{EG}$ (and $Q_{EA}$ if present) may be controlled by circuits comprising circuits ("Ccts"), some or all of which may be integrated into the IC controller. Alternatively any or all of the control circuitry of FIG. 1, for example circuitry of "Ccts" or current source $I_B$, may be embodied as discrete components.

In this embodiment, the primary switch $Q_{SW}$ is a bipolar transistor, for example a bipolar junction transistor (BJT), connected in the cascode, or emitter-switched, configuration. A capacitance $C_{BE}$ is shown between the base and emitter terminals of the BJT $Q_{SW}$ in dashed lines. This represents the sum of the intrinsic charge storage in the BJT and any additional capacitance provided between these terminals. $Q_{EG}$ is a low voltage, high current switch on the IC, controlling $Q_{SW}$ emitter current to a reference voltage, here chosen to be 0 V (Gnd). Among benefits of employing the cascode arrangement are: Fast switching—both on and off—due to $Q_{EG}$ being a low voltage device; high voltage withstanding capability with an advantageous reverse-bias safe operating area (RBSOA); and/or low no-load power consumption due to the ability to use the gain of $Q_{SW}$ to generate start-up current. At start-up, a small current from $V_{IN}$ through start-up resistor $R_{START}$ causes the $Q_{SW}$ base voltage to rise, biasing $Q_{SW}$ to conduct collector-emitter current. This current, which is larger than the base current flowing through $R_{START}$ by a factor of the $Q_{SW}$ gain, flows via diode $D_{EA}$ to the IC's charge reservoir $C_{AUX}$ (since switches $Q_{BA}$, $Q_{BG}$ and $Q_{EG}$ are open). $R_{START}$ may thus be chosen to have a relatively large value, for example around 40MΩ, allowing power dissipation in $R_{START}$ to be reduced.

Instead of biasing the base terminal of a BJT in the cascode configuration to a DC voltage to ensure conduction when the emitter switch $Q_{EG}$ is closed, the present embodiment employs switching of the $Q_{SW}$ base terminal to more precisely control operation of the BJT: the $Q_{SW}$ base terminal is connected to a low reference voltage, chosen to be Gnd in FIG. 1, via switch $Q_{BG}$. The $Q_{SW}$ base terminal is also connected to a source of current $I_B$ via switch $Q_{BA}$. $I_B$ may be an active current source or simply a resistor connected to a voltage source, such as the Aux (auxiliary) rail.

Advantageously, this switched base and emitter approach may retain the reliability benefit of open emitter switching inherent to the cascode arrangement but also limiting the peak voltage excursion of the emitter during turn off. With the emitter terminal open there is generally no opportunity for current gain in the BJT provided that the peak emitter voltage does not cause any current flow into connected circuits (e.g. $D_{EA}$). Without opportunity for emitter current flow, the BJT can withstand higher collector voltages during and immediately following turn-off without adverse breakdown that could degrade power efficiency and reliability. A practical result may be that, with appropriate switch control, the BJT's applicable breakdown voltage can be higher in this configuration compared to configurations that are only base-switched or only emitter-switched. This may add a cost advantage to the base+emitter switched arrangement.

Figure 2:
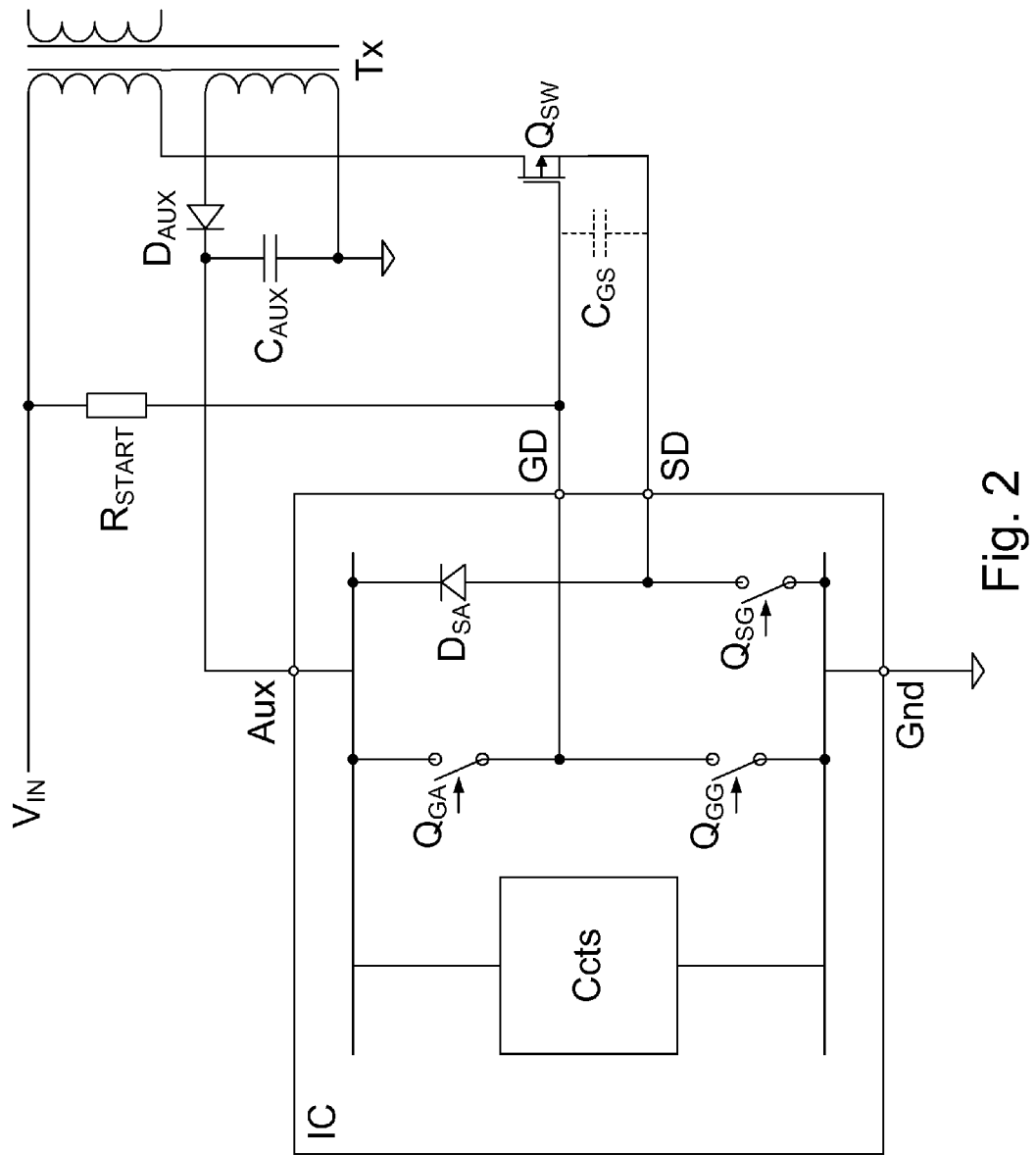
FIG. 2 shows a second circuit schematic for auxiliary recharge.

With some modifications the same approach may be taken to switch a field effect transistor (FET), for example a metal-oxide-semiconductor FET (MOSFET), as shown in FIG. 2.

In an example embodiment based on FIG. 1, the transformer Tx may be referred to as an inductive component, which is coupled to receive power from the input VIN. Switches QSW and QEG respectively provide first and second switching transistors of a switching circuit, wherein switching of the second transistor may be controlled by the switching controller 'Ccts', and switching of the first transistor is controlled at least by a bias signal on a control line, e.g., base terminal, of the transistor. A charge store in the form of capacitor CAUX is configured to receive current from a conduction path comprising for example a controllable switch and/or diode DEA, each generally comprising a semiconductor junction to allow forward bias current flow. Thus a current diversion circuit comprising such a conduction path to bleed current from Qsw to Caux may be provided. An additional capacitor CBE external to the first switching transistor Qsw may be provided to assist allowing the first switching transistor Qsw to conduct current that is diverted to the conduction path; however intrinsic capacitance of the transistor Qsw may assist in this regard, with or without the external capacitor. Flow of such current through the conduction path may be enabled by the second transistor QEG decoupling the transistor Qsw from a reference voltage line, e.g., Gnd as shown in FIG. 1.

Further considering FIG. 1, QBA may be referred to as a bias decoupling switch, which is coupled between a bias output line (from, e.g., a current source IB) and an output line to provide a bias signal to the control line (e.g., base) of the first switching transistor Qsw.

Figure 3:
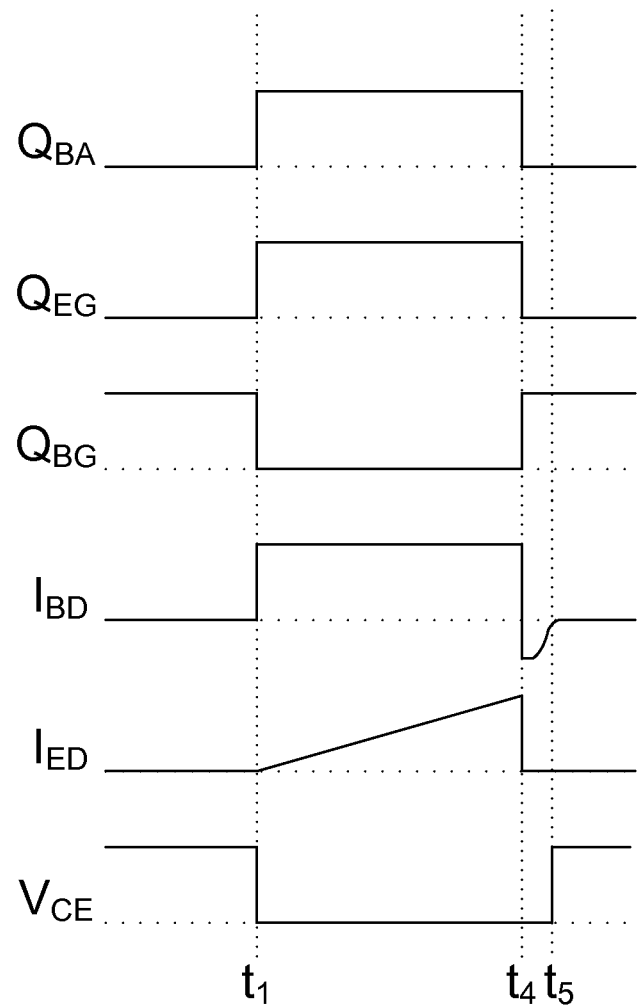
FIG. 3 shows waveforms illustrating an arrangement for a BJT control scheme.

By appropriate control of switches $Q_{EG}$, $Q_{BG}$ and $Q_{BA}$ and of current source $I_B$ a wide range of BJT control techniques may be implemented. An illustration of a basic scheme is provided in FIG. 3 showing, from top to bottom of the drawing, states of switches $Q_{BA}$, $Q_{EG}$ $Q_{BG}$, and variation of $I_{BD}$, $I_{ED}$ and $V_{CE}$, with time points $t_1$, $t_4$ and $t_5$ along the time axis. (noting that nothing is implied by the omission of, e.g., time point $t_2$).

In the arrangement of FIG. 3, the waveforms $Q_{BA}$, $Q_{EG}$ and $Q_{BG}$ illustrate the logic states of those switches, with the higher level representing a switch on state and the lower level representing a switch off state. In this simple example switches $Q_{BA}$ and $Q_{EG}$ are closed (i.e. turned on) simultaneously at time $t_1$, providing base current drive $I_{BD}$ out of IC terminal BD whilst the emitter terminal of $Q_{SW}$ is connected to Gnd. This closes $Q_{SW}$, causing current to flow through a primary winding of transformer Tx to Gnd. Switch $Q_{BG}$ is controlled in opposite phase to $Q_{BA}$ and $Q_{EG}$. When closed at time $t_4$ it provides a low impedance to reverse base current, shown as a negative lobe on base current $I_{BD}$, and asserts a reliable turn-off when $Q_{SW}$ opens at time $t_5$. In this simple example base current from current source $I_B$ is held at a constant value while $Q_{BA}$ is closed. The $Q_{SW}$ emitter current into the IC's ED pin, $I_{ED}$, is illustrated in FIG. 3 as a typical ramping current through the primary winding of the coupled inductor of a flyback converter, merely as a convenient example (embodiments are generally applicable to other converter types, for example forward, boost, buck or other converter topologies). Waveform $V_{CE}$ represents the collector-emitter voltage of BJT $Q_{SW}$, showing the blocking and conduction phases. Note that between times $t_4$ and $t_5$ the primary inductor current continues. Such current may flow to ground as reverse base current, via the IC terminal BD and switch $Q_{BG}$. Hence switch $Q_{BG}$ is preferably capable of conducting currents as large as those conducted by switch $Q_{EG}$.

An embodiment may however provide improved management of $V_{AUX}$, the voltage across IC charge reservoir capacitor $C_{AUX}$. Example waveforms are shown in FIG. 4.

Figure 4:
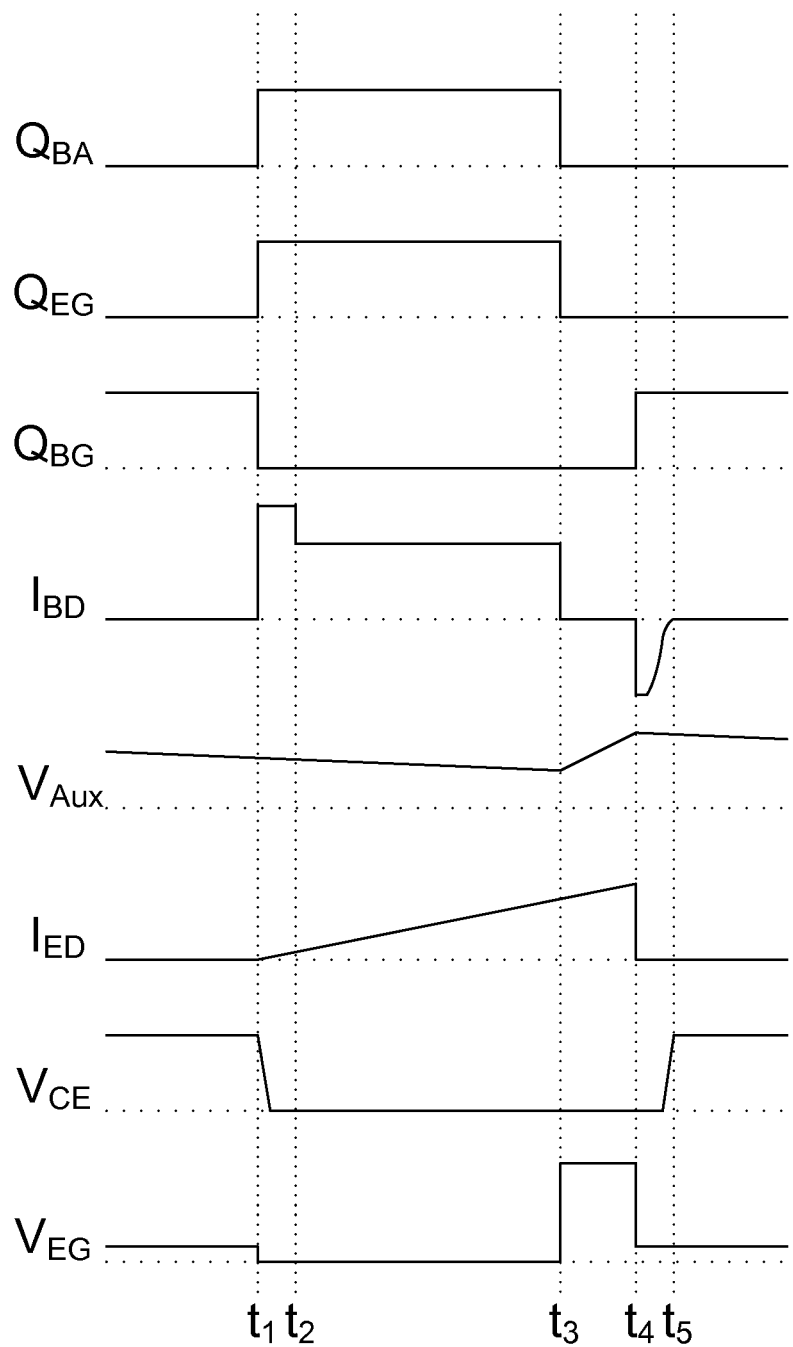
FIG. 4 shows waveforms illustrating a BJT control scheme for auxiliary recharge.

In contrast to the control scheme of FIG. 3, in the BJT control scheme embodiment of FIG. 4, $Q_{EG}$ is opened at a time $t_3$ earlier than $t_4$, while $Q_{BG}$ remains open. With stored charge maintaining $Q_{SW}$ in its on state until time $t_5$, the $Q_{SW}$ emitter terminal voltage rises until diode $D_{EA}$ is forward biased. This forces $Q_{SW}$ emitter current through $D_{EA}$ to $C_{Aux}$, via the Aux terminal of the IC, or directly if a discrete diode $D_{EA}$ is used. In other words, for a controlled period, collector current flows to $C_{Aux}$ rather than to Gnd, providing an alternative source of power to the IC. Because switches $Q_{BA}$, $Q_{EG}$ and $Q_{BG}$ are all open, the $Q_{SW}$ base terminal voltage rises with its emitter terminal voltage, the latter being illustrated in FIG. 4 as $V_{EG}$. The increase in $V_{Aux}$ illustrated in FIG. 4 indicates auxiliary recharging.

Although base drive, i.e. switch $Q_{BA}$ and/or current source $I_{BD}$, is inhibited at time $t_3$ in the scheme of FIG. 4, it may be preferred to continue to drive the base terminal for some or all of the period from time $t_3$ to time $t_4$, whilst $Q_{SW}$ emitter current flows through $D_{EA}$ to $C_{Aux}$. This may require a higher base bias voltage to be applied, due to the rise in the emitter terminal voltage of $Q_{SW}$. Such an increase in base bias voltage may be achieved, for example, by using a voltage converter such as a charge pump between the Aux rail and the $Q_{SW}$ base terminal.

Referring to the MOSFET $Q_{SW}$ embodiment of FIG. 2 and the waveforms of FIG. 4, it is noted that the gate-source voltage established by $Q_{GA}$ and maintained by gate-source capacitance $C_{GS}$ keeps $Q_{SW}$ in conduction whilst switch $Q_{SG}$ is open, since the $Q_{SW}$ gate terminal voltage rises with its source terminal voltage. This is generally true as long as switches $Q_{GG}$ and $Q_{GA}$ remain open.

Although FIG. 4 shows the auxiliary recharge period as occurring after all of the base current has been delivered for that switching cycle, alternative timings may be preferable. For example $Q_{BA}$ (base current switch) and $Q_{EG}$ (emitter current switch) might be opened after an initial period of base current drive, once $Q_{SW}$ has reached the desired degree of saturation. Further base current may then be applied to $Q_{SW}$ after the auxiliary recharge period, by closing switches $Q_{BA}$ and $Q_{EG}$, to maintain a desired degree of saturation. The amount of charge delivered to $C_{Aux}$ during an auxiliary recharge period depends on the length of the period that $Q_{BG}$ and $Q_{EG}$, and optionally $Q_{BA}$, are open and the amplitude of the $Q_{SW}$ collector current during that period. The timing of auxiliary recharge periods may therefore be optimised for a given application. For example, although the auxiliary recharge period shown in FIG. 4 immediately follows the end of the base drive current, its onset may occur at any time before $t_4$ by delaying the opening of switch $Q_{EG}$.

In the present embodiment, auxiliary recharge can be terminated immediately by closing either or both of switches, $Q_{BG}$ and $Q_{EG}$. For example, for a flyback or forward converter the auxiliary recharge effect is generally greatest if it occurs towards the end of the BJT conduction period, when $Q_{SW}$ collector current is greatest. In higher power converters the auxiliary recharge effect may be sufficient if it occurs earlier in the BJT conduction period; this may also avoid excessive switched current through diode $D_{EA}$.

Although the above description focuses on the switched base and emitter arrangement of FIG. 1, the essence of the technique is applicable to other cascode arrangements. For example an approach employing a DC base voltage bias may also make use of an auxiliary recharge technique, as shown for example in FIG. 5.

Figure 5:
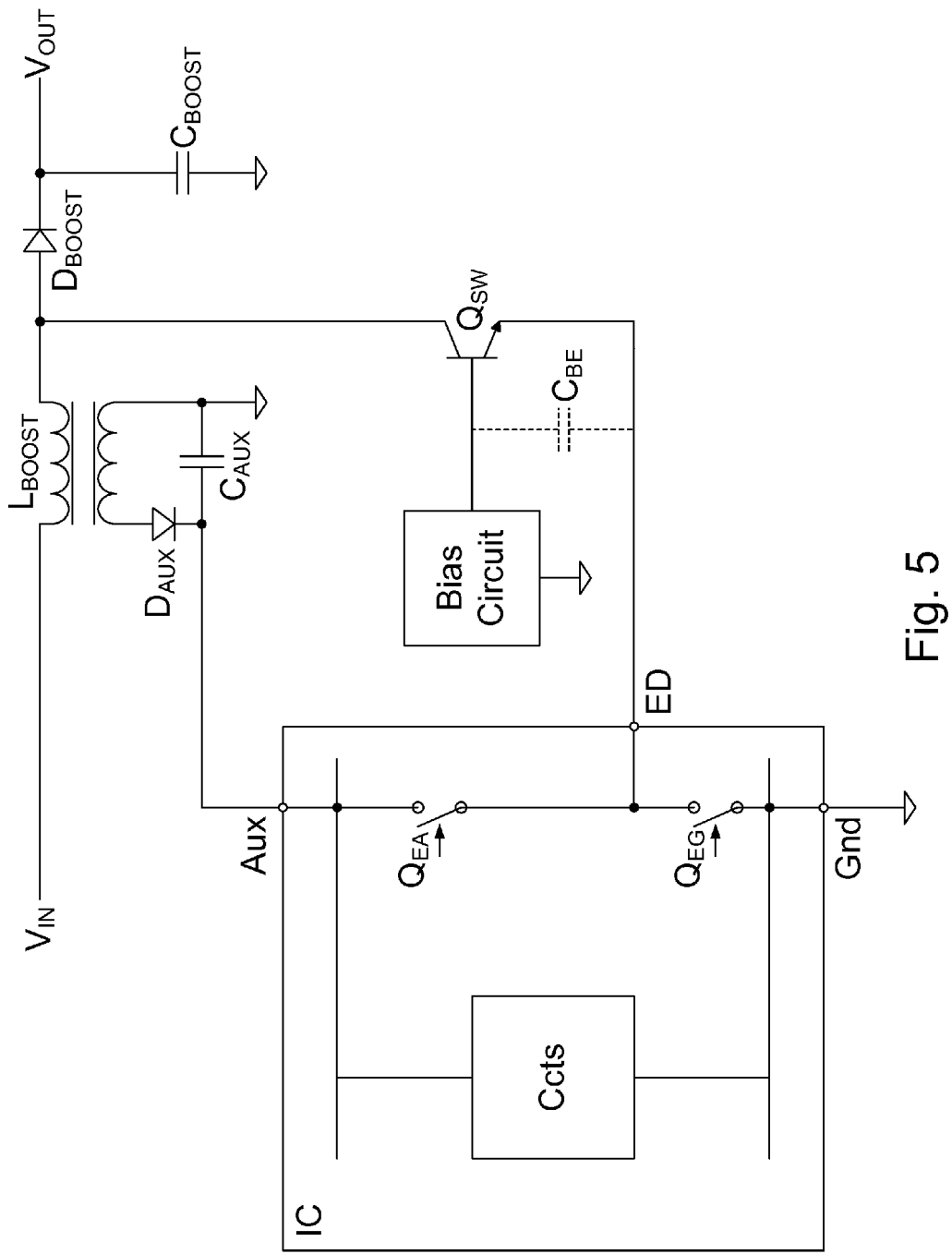
FIG. 5 shows a third circuit schematic for auxiliary recharge, employing a DC base voltage bias.

The embodiment of FIG. 5 illustrates an example of auxiliary recharge in the context of a boost converter. Boost inductor $L_{BOOST}$ replaces transformer (or coupled inductor) Tx, and an auxiliary winding is shown as an example power source for the IC. However the embodiment is equally applicable to other converter types already mentioned above. A bias circuit ensures that switch $Q_{SW}$ is maintained on when inductor current is required to flow. Such inductor current may flow either to the low reference voltage (Gnd) via switch $Q_{EG}$ when that switch is closed, or to $C_{AUX}$ via switch $Q_{EA}$ when that switch is closed. During the $Q_{SW}$ on time an auxiliary recharge period may be enabled by opening switch $Q_{EG}$ and closing switch $Q_{EA}$. During auxiliary recharge the $Q_{SW}$ emitter voltage rises a little above that of the Aux capacitor $C_{AUX}$. This provides a guide for the required bias voltage for the $Q_{SW}$ base terminal. In order to turn switch $Q_{SW}$ off, hence stopping inductor current flow, both switch $Q_{EG}$ and switch $Q_{EA}$ are opened.

The bias circuit may comprise any suitable means for providing the required voltage at the control terminal (i.e. base of a BJT or gate of a MOSFET or IGBT) of switch $Q_{SW}$. As such, the bias circuit may comprise combinations of resistive, capacitative and/or inductive components, rectifiers and/or switches, etc. The source of the voltage bias may be any suitable voltage source, for example the mains input voltage $V_{IN}$, a winding associated with the inductive component, and/or a DC voltage source such as a battery.

In any embodiment, by detecting $V_{Aux}$ and comparing it to a reference level, for example using circuits included in "Ccts" in the IC controller of FIG. 1, a decision can be made by the IC controller as to whether an auxiliary recharge period is required in a switching cycle. Such detection and comparison may additionally be used to determine the length and/or timing in the switching cycle of an auxiliary recharge period. Because auxiliary recharge can be controlled it may be used to regulate $V_{Aux}$ to a desired value. A lower voltage, for example 3V, may allow base current to be generated at lower resistive loss compared to typical converters, for which $V_{Aux}$ varies widely—and is generally highest when highest base current is needed.

It is possible in an embodiment to use auxiliary recharge to deliver more charge to $C_{Aux}$ than is taken out for base drive current in each cycle. This is because the current gain of the BJT $Q_{SW}$ multiplies the base current in producing the emitter current, and means that there can be a surplus to operate the controller.

The above generally focuses on one challenging case of BJT-based converters. However, embodiments are generally applicable where the cascode uses field effect, e.g., field effect, e.g., MOSFET, and/or bipolar, e.g. BJT, transistors in any combination. Thus, in alternative embodiments, a MOSFET or an IGBT, rather than a BJT, may be employed as $Q_{SW}$ in a source-switched cascode arrangement. Such an arrangement is illustrated in FIG. 2. In this case the charged gate-source capacitance, rather than accumulated base charge, keeps the MOSFET or IGBT in conduction during auxiliary recharge. Alternatively, a DC gate voltage bias arrangement may be employed that is equivalent to the DC base voltage bias arrangement illustrated in FIG. 5.

For some applications it may be possible for auxiliary recharge to be the sole mechanism for supplying current to the IC charge reservoir capacitor $C_{AUX}$. This enables the auxiliary winding to be omitted from the transformer Tx, and is illustrated in FIG. 6.

Figure 6:
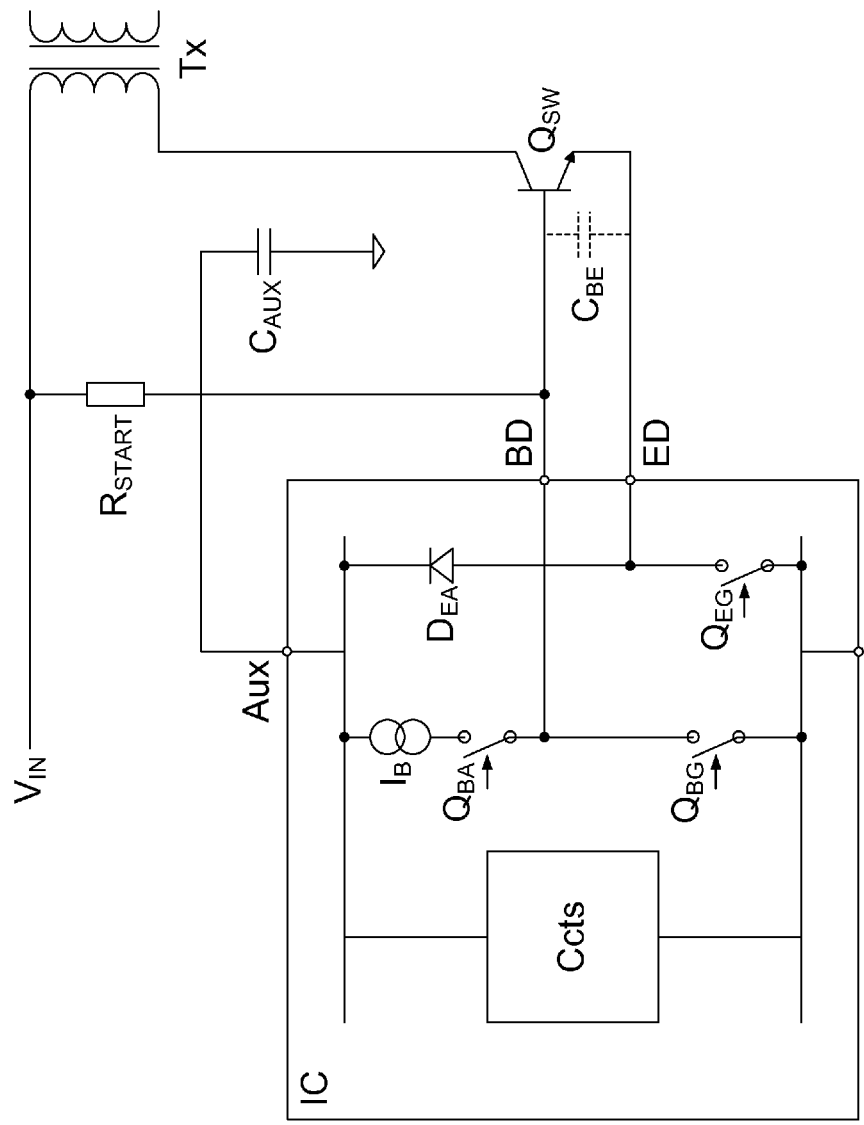
FIG. 6 shows a circuit schematic lacking an auxiliary winding on the transformer Tx.

The embodiment of FIG. 6 advantageously allows cost and space savings, and avoids design and electromagnetic interference issues, associated with the omitted auxiliary winding and the diode $D_{AUX}$. It may also be possible to place the reservoir capacitor $C_{AUX}$ inside the IC. This may eliminate discrete capacitor $C_{AUX}$ and dedicated IC terminal Aux, which may be used for another function or omitted entirely.

FIG. 7a shows a method which may be implemented in any of the above, or other, embodiments. Preferably the method comprises a control procedure wherein the switches $Q_{BA}$, $Q_{BG}$, $Q_{EG}$ and/or $Q_{SW}$ (or $Q_{GA}$, $Q_{GG}$, $Q_{SG}$ and/or $Q_{SW}$ as appropriate) are controlled by a controller such as the switching controller (shown as an IC in FIGS. 1, 2, 5) to implement the method. Such control may further comprise controlling a switch that is provided additionally or alternatively to the diode $D_{EA}$ ($D_{SA}$) to turn the conduction path to the charge store on.

Generally speaking, control of $V_{Aux}$ in the manner described may be particularly advantageous in relation to one or more of the following:

Start-up: auxiliary recharge may allow charge to be added to $C_{Aux}$ in every switching cycle, providing sufficient IC bias power before the output and bias winding voltages rise. This may ease the balance of initial $C_{Aux}$ charge and start-up ability of conventional converters, particularly when driving a load having high input capacitance. Alternatively or additionally, auxiliary recharge may enable the use of a higher start-up resistor $R_{START}$ and/or a smaller reservoir capacitor $C_{Aux}$. This may reduce power dissipation in $R_{START}$ and/or start-up time; and/or Low impedance load: auxiliary recharge may provide IC bias power when the steady state output and bias winding voltages approach zero, allowing converter output current control to be maintained. This may even be possible in output short circuit conditions.

Supplementary Base Drive

We now consider supplementary base drive (SBD), with regard to use of a bipolar junction transistor (BJT) as the primary switch in a power converter such as an offline and/or flyback power converter.

In primary side sensing controllers, the output voltage may be well-controlled, whereas an auxiliary winding voltage that may be used to feed a switching control circuit (e.g., controller IC) may vary considerably due to load variations on the main output. Specifically, the auxiliary voltage increases as output load increases.

The auxiliary winding may further be used to feed the base charge/current. However, as the output power demand increases, the base charge or current requirement increases. That may cause an increase in the power dissipation in a primary side controller.

Embodiments may however provide drive schemes with improved thermal performance and thus applicable in SMPCs operating at high output power ratings and/or with lower gain primary switches. In particular, an embodiment may allow a wide range of BJTs to be driven optimally using a SBD line, e.g., pin. This may be performed using a reliable, low cost approach that may require only one external resistor for a primary side-sensing flyback converter. (In embodiments, a supplementary base drive line may be considered to be for example the line (e.g., pin/wire/connection/track) at BD in FIG. 8, and/or the coupling from Dext to the Qsw base current line from BD in FIG. 8, or may be represented as in FIG. 9 by, e.g., the line at SBD to Rest or the line coupling the base current line of switch $Q_{SBD}$).

As may be understood from FIGS. 8 and 9, in an embodiment the primary switch Qsw derives its base current via a controller chip rather than more directly from the auxiliary rail. (In embodiments the auxiliary rail may be, e.g., the line from Daux to 'Aux' in FIG. 8, carrying voltage Vaux; an auxiliary line may be considered for example as the 'Aux' line (wire, track, etc.) within the IC of FIG. 8 or 9 connecting to the 'Aux' line (e.g., pin) that couples to the auxiliary power rail). Consequently, timing of switching the primary switch on and off may be controlled precisely to improve regulation of converter output voltage and/or increase power efficiency. For example, the controller of FIG. 8 or 9 may monitor (not shown) the turn-on time and/or turn-off time (comprising the base discharge time) of the primary switch, e.g., by sensing the Qsw base, collector or emitter voltage, to thus control the base current and/or switching timings of Qsw for minimum power dissipation, taking into account for example base charge storage of the transistor and associated power dissipation when switching Qsw. In a preferred embodiment, discharge time (or variation thereof) of Qsw is monitored/measured and the on time of Qsw in a subsequent cycle controlled on this basis.

In this regard, it is noted that the provision of the supplementary base drive resistor Rext with current control element Dext or $Q_{SBD}$ does not jeopardise such Qsw control in an embodiment. For example, switching of current control element in the form of a supplementary base drive switch $Q_{BBD}$ may be controlled by the same signal applied to control base current switch $Q_{BA}$. Thus the effect of $Q_{SBD}$ may merely be to supplement (effectively amplify) the controlled base drive from the controller, e.g., wherein a fraction, e.g., 0.5, of the total base current is supplied from the controller $Q_{BA}$ and the remaining fraction, e.g., 0.5, from Vaux via Rext. Switch $Q_{BG}$ may be referred to as a base discharge switch.

As can be seen by comparison of the circuits of FIGS. 8-9 with FIGS. 1 and 6, similar switch arrangements are provided in these circuits, thus a supplementary base drive series circuit (Rext, with Dext or QSBD as shown in FIGS. 8 and 9) may be provided with any embodiment described above wherein the primary switch is bipolar and switch controlled (use with FIG. 5 having the bias circuit shown is less preferable).

Concerning such similarity, each of the first transistor Qsw, switching controller Ccts, current source $I_B$, bias decoupling switch $Q_{BA}$, switch $Q_{BG}$, second transistor $Q_{EG}$, bootstrap diode $D_{EA}$ (between Aux and ED pins, may alternatively be a different type of component having a semiconductor junction, e.g., switch such as a transistor, forming at least part of a conduction path/current diversion circuit), start-up/bootstrap resistor $R_{START}$, reservoir capacitor/charge store $C_{AUX}$, auxiliary diode $D_{AUX}$, intrinsic capacitance $C_{BE}$, and inductive component (transformer or coupled inductor) Tx elements of FIGS. 1 and 6 generally correspond to the bipolar transistor Qsw, switching control circuit Ccts, base current source $I_B$, base current switch $Q_{BA}$, base discharge switch $Q_{BG}$, emitter current switch $Q_{EG}$, bootstrap element $D_{EA}$, bootstrap circuit component $R_{START}$, charge store $C_{AUX}$, auxiliary diode $D_{AUX}$, intrinsic capacitance $C_{BE}$, and inductive component (transformer or coupled inductor) Lx of FIGS. 8 and 9, respectively.

However, the series circuit may be provided in an embodiment regardless of whether the embodiment is configured and/or operated to perform auxiliary recharge. Thus, the example timing diagrams of FIGS. 3 and 4 may or may not be implemented in an embodiment having the series circuit.

An advantage of an embodiment having the series circuit is to allow a converter controller for controlling a primary side switch of a flyback, boost or forward converter, the controller preferably in the form of an integrated circuit, to be used for higher power rating converters and/or to drive a lower gain (beta) bipolar such primary side switch. Generally, higher base current to the primary side switch is required to achieve higher output power of the converter and/or to operate at a given output power with a lower gain transistor. However, the thermal performance of the controller, for example determined by controller IC packaging (e.g., SOT23 6-pin package), may place an upper limit on base current. An embodiment may allow this limit to be overcome. In operation, the base current may be highest when the converter has full load and the auxiliary rail voltage (Vaux) is thus high.

Advantageously, an embodiment according to any approach described herein may allow use of a controller, e.g., in an 8-pin SOP8 package, to be used to control the primary switch of a converter delivering more than 7.5 or 8 W, preferably over 10 W, more preferably upto at least 15-16 W. Additionally or alternatively, such a controller may be used to control the primary switch of a converter delivering such power output or lower wherein the primary switch has a current gain (beta) of less than 10, more preferably less than 5, compared for example to a current gain of upto 40 as may otherwise be necessary.

A first embodiment for supplementary base drive is shown in FIG. 8. This approach uses an external diode and external resistor to support the few percentage of required charge/current for the base. The percentage support on the base current/charge depends upon the value of the external resistor. The series combination is connected from auxiliary (Aux) rail to the base current line BD or base pin of the BJT.

The base current/charge requirement comes mainly from the output power, DC gain of the BJT.

To assist understanding of such an embodiment, we consider first the scenario where there is no external base charge/current support. The full base current is supported by the controller. The current flows from the Aux pin to BD via current source $I_B$ and switch path $Q_{BA}$ as shown in FIG. 8 and current requirement from BD pin mainly depends on the current gain parameter (Beta) of the BJT used and on the output power.

For higher power design and very low cost solutions used in primary side sense fly back circuits, the Aux rail is not a regulated supply—it varies with the load on the output.

Whereas the output is the main regulated winding via the feedback pin (FB). At the full load output condition, the Aux Voltage rises to a high voltage, e.g., approximately 15V.

As a result of increase in the Aux voltage and BD current requirement, there is an increase in the power dissipation in the controller. Consequently the controller heats up.

We now consider supplying a few percent of the base charge/current externally from the Aux rail via $R_{ext}$ and $D_{ext}$. The power dissipation in the controller goes down, whereas we start dissipating power in the external resistor. The main control mechanism of timings on ON/OFF timings of BJT Qsw is under the controller control. An approach such as shown in FIG. 8 allows use of the same controller for higher output power designs by reducing the power dissipation in the controller.

The $D_{ext}$ is used to isolate the $R_{ext}$ and $D_{ext}$ series circuit during the start-up. During start-up, current is fed from the high voltage (HV; $V_{IN}$) rail to Aux via a bootstrap circuit comprising $R_{startup}$ and BJT base. The current is amplified by the current gain (beta) of the transistor and flows from internal emitter line (ED) to the Aux capacitor $C_{AUX}$ via the bootstrap diode (alternatively a bootstrap switch) provided between the auxiliary line (Aux) and emitter current line (ED) of the controller (noting however that a switch may be provided as an alternative to the bootstrap diode). The current charges the Aux capacitor $C_{AUX}$ via this amplified current and when Aux reaches the designed start up levels the controller starts functioning. Thus, a bootstrap process may be implemented to provide the auxiliary supply to the controller for controlling the primary switch Qsw.

In the absence of $D_{ext}$, the current gain (beta) of the BJT Qsw may not be used to enhance the start up. The current instead starts to flow from Rstart and through resistor $R_{ext}$ to Aux. Such unamplified current is not sufficient to charge the auxiliary capacitor. Moreover, start up may fail to happen if the unamplified current is not able to charge the Aux capacitor to a required level. Thus, a desirable purpose of $D_{ext}$ may be to allow the above bootstrap process.

It is noted that series circuit of $R_{ext}$ and $D_{ext}$ does not degrade switching control of the primary switch Qsw in an embodiment. While current may continuously flow through the series circuit, the switch $Q_{BG}$ is preferably operated to route this current to a reference line (Gnd; coupled to a reference voltage, e.g., ground) and thus away from the primary switch base when the primary switch is not to be controlled on (e.g., in Dchg, and/or in the ring and/or or idle periods where these are present).

A more preferred solution illustrated schematically in FIG. 9 shows a second approach, wherein external diode $D_{ext}$ is removed and replaced by a controllable switch. For example, the internal switch $Q_{SBD}$ is used in place of $D_{ext}$ and external pin SBD is provided on the controller where $R_{ext}$ is connected from Aux. Similarly to with FIG. 8, such an embodiment may allow to use the controller with a primary BJT switch having lower gain and/or higher power designs.

Replacing the diode Dext of FIG. 8 with a switch as in FIG. 9 (the switch QSBD internal or external to the controller) may further advantageously reduce standby, i.e., no load, power, for example compared to embodiment of FIG. 8 wherein the internal switch $Q_{BA}$ is on in primary switch Qsw on time (Chg) and $Q_{BG}$ is on in primary switch off time (e.g., Dchg). In a no load period, the primary BJT off timings are much greater than primary switch on timings, and $R_{ext}$ and $D_{ext}$ in an embodiment of FIG. 8 may draw current during the off timings from the Aux rail so that current flows from $R_{ext}$ and $D_{ext}$ to $Q_{BG}$. The switch of FIG. 9 may be operated to block such current during standby period and/or during a dchg, ring and/or idle period (e.g., full off period) of a switching cycle of the primary switch.

In the approach of FIG. 9, there is no need for the diode Dext of FIG. 8 for the purpose of allowing bootstrapping. Preferably, QSBD is maintained off during start-up to prevent start-up current from Rstartup flowing through Rext instead of towards Qsw.

The switch $Q_{SBD}$ is preferably controlled by the controller such that it is turned on in the current/charge requirement time (Chg) of the base of the BJT (during on period of BJT). The switch $Q_{SBD}$ may provide a few percentage of the required base current depending on $R_{ext}$. The power dissipation in the controller may then go down, whereas power is dissipated in the external resistor.

A further optional feature is control the switch $Q_{SBD}$ to turn on in the Dcharge time of the cycle so that Rext starts loading and thus drawing current from the Auxiliary rail preferably such that Vaux doesn't rise higher. Thus, both of $Q_{SBD}$ and $Q_{BG}$ may be on during at least part of the off (e.g., Dchg) period. This feature may be active when Vaux reaches a threshold voltage, e.g., 15.5V. In an embodiment, the controller is configured to monitor Vaux and enable this feature when Vaux reaches or exceeds such a threshold. Preferably the feature is inhibited during start up.

Thus, the switch $Q_{SBD}$ of FIG. 9 may have a single or dual purpose: (i) to provide base current additional to that provided by the controller to the primary switch; and/or (ii) to dissipate power from the auxiliary rail preferably such that the auxiliary voltage Vaux supplied to the controller does not go beyond a rated operating voltage of the controller. Such a rated operating voltage may be a maximum voltage below which the controller (e.g., IC) is known to operate according to a desired technical specification and/or safely.

Further advantageously, the embodiment of FIG. 9 may reduce the bill of materials (BOM) size/count for example if the switch $Q_{SBD}$ is internal to the controller.

(Further regarding FIGS. 8 and 9, the Ccts block with/without the further circuitry within the IC, may be referred to as switching controller, winding W1 is coupled to receive power from an input VIN to the SMPC, first and second switching transistors may be provided as Qsw and QEG respectively, a current diversion circuit or conduction path may comprise diode DEA and/or a controllable switch, and/or a reference voltage line may be a ground line ('Gnd')).

Referring to the timing diagram of FIG. 10, a switching cycle of the primary switch may be described as comprising an on period (Chg) and an off period comprising a discharge period (Dchg), optionally then a ring period (Ring) and/or a following idle period (Idle). Generally, the states of the ground connection switches $Q_{BG}$ and $Q_{EG}$ are opposite. Thus, during the Chg period when the primary switch is driven on, $Q_{EG}$ is on while $Q_{BG}$ is off; furthermore, $Q_{BA}$ is preferably on. During the Dchg period, $Q_{BG}$ is on while $Q_{EG}$ is off. During the Chg period, $Q_{BA}$ is preferably on whereas during the Dchg period $Q_{BA}$ is preferably off. The Vcc curves in FIG. 10 show example collector voltage characteristics of the primary switch.

Where an embodiment such as that of FIG. 9 is provided, $Q_{SBD}$ may be on for at least part of the time when $Q_{BA}$ is on (see optional $Q_{SBD}$ on time (1) in FIG. 10, which time may extend partially or fully through the Chg period of Qsw). This may allow for bleeding additional base current to the primary switch Qsw. Additionally or alternatively turning $Q_{SBD}$ on for at least some of the time that $Q_{BG}$ is on may allow for reduction of the Vaux (see optional $Q_{SBD}$ on time (2) in FIG. 10, which time may extend partially or fully through the off period (DChg, Ring and/or idle) of Qsw).

In light of the above, example optional features of any embodiment may be one or more of:

1. as the base drive is required in charge time or on state of the BJT, the BD to Aux switch $Q_{BA}$ and SBD to Aux switch $Q_{SBD}$ are turned on in the charge time and are synchronized internally by the controller and provide the base current. The main control function is performed by the BD pin whereas SBD provides the few percent required support current or charge depending on value of external resistor $R_{ext}$ and allows the chip to run less hot thermally;
2. the QSBD switch is turned on in the Dcharge time (depending on Vaux Voltage level) and bleeds current from Aux to ground via $Q_{SBD}$ and $Q_{BG}$ switches in Dcharge time.

Further Considerations Relating to Auxiliary Recharge

Supplementary base drive using a series circuit as described above for example with reference to FIGS. 8-10, optionally with operation of any of the switches Qsw, QBA, QBG, QEG and/or QSBD as described above, may be provided in conjunction with any of the first to fourth developments for auxiliary recharge as set out below, where the development has a bipolar first/primary switch.

According to a first development, there is provided a method of providing power to a switching controller of a switch mode power converter (SMPC), the SMPC having: an inductive component having a winding coupled to receive power from an input to said SMPC; a switching circuit comprising first and second switching transistors, said first transistor coupled in series between said winding and said second transistor; a switching controller to control switching of said second transistor; and a charge store to provide power to said switching controller, the method comprising: establishing a flow of current from said winding through said first transistor; and diverting said current through a conduction path to said charge store.

Thus, an embodiment may provide an alternative or additional means for maintaining sufficient power to the switching controller, preferably regardless of output voltage and/or load of the SMPC, which is preferably a cascode power converter. This may be achieved in an embodiment by using BJT emitter or MOSFET source current to provide power for a converter controller IC during a switching cycle, for example during normal (e.g., PWM-controlled) operation, i.e., when the SMPC is providing power to the load, after a start-up of period the SMPC.

Regarding more specific advantages, an embodiment may: reduce constraints on auxiliary charge circuit design; allow a switching controller to maintain control at very low output voltages; broaden utility of BJT-based converters; and/or improve start-up characteristics.

Preferably, the power provided to the switching controller is DC (direct current). Similarly, the SMPC is preferably for providing a DC output voltage to a load. A load on the SMPC may be, e.g., inductive, resistive and/or capacitive. The inductive component may for example be a transformer having a primary winding coupled to receive the power from an input to said SMPC, and a secondary winding coupled to provide power for an output voltage to a load. However, the SMPC may be a non-isolated converter in an alternative embodiment.

As inferred above, the switching circuit is preferably a cascode circuit, wherein the first transistor is coupled between the winding and a second transistor to form a cascode arrangement, the second transistor preferably connected to a reference voltage line, e.g., ground. Nevertheless, in such an arrangement, the cascode circuit does not necessarily comprise the first and second transistors coupled directly to each other, the first transistor coupled directly to the winding and/or the second transistor directly to a reference voltage line. For example, the first and second transistors may have components connected between them, e.g. a current sense resistor, placed between the winding and/or transistors or between the second transistor and the reference voltage line. In a cascode arrangement, the second transistor may be coupled to controllably drive, i.e., emitter- or source-switch, the first transistor and thereby control current in said winding. However, it is noted that conduction of the first transistor directly controls current in the winding. It is further noted that, the first transistor may stay on when the second turns off—conduction by the first transistor (with current exiting either of the emitter or base terminals) advantageously defining the period during which current is switched through the inductive component.

While the first transistor is in embodiments typically a power transistor, the second transistor may be a power transistor or a low voltage device.

There may further be provided the method, comprising inhibiting receiving on a control line of said first transistor a bias signal, said bias signal for outputting a charge to said first transistor. Notably, the first and second transistor on-times are generally not coincident in an embodiment. Thus, considering an embodiment, a time interval defining when the bias signal biases the first transistor on may not be the same time interval as that of the second transistor being on and/or that of the current flow flowing.

Alternatively, one could maintain base drive or gate bias during flow of current. Nevertheless, where such inhibiting is performed, the diverted flow of current preferably flows during substantially the full time extent of the inhibiting, or shorter, for example as long as the first power switch stays on during the inhibiting. Advantageously, inhibiting alone does not cause the first transistor to immediately stop conducting current from the inductive component.

An embodiment may divert the current to the charge store to perform auxiliary recharge in any switching cycle, regardless of what mode the SMPC may be in. In embodiments, start-up typically consists of an initial phase when the charge store, e.g. capacitor, is being charged from a DC source (e.g. a low current from rectified Vht through a large resistor Rstart or a normally-on start-up switch). Preferably, the controller IC is still asleep, hence no switching occurs. Once the voltage on the charge store ('auxiliary voltage') reaches a threshold the IC wakes up and instructs switching to begin. This is generally when the SMPC output voltage begins to rise. Auxiliary recharge can be performed during this rise to help keep the IC awake while it 'pulls up' the load, while the SMPC may still be in its start-up phase. Thus, auxiliary recharge can be performed in any switching cycle, including during and/or after converter start-up. More specifically, auxiliary recharge may be used in an embodiment during normal SMPC operation, i.e., after cold-start, and/or during an SMPC output voltage rise phase of start-up.

Thus, there may generally be provided the method, wherein said flow and diverting occur during a switching cycle of said switching circuit, said switching cycle for allowing (preferably enabling) outputting of said power for said output voltage to said load; such a switching cycle may comprise a single on-off cycle of the second transistor and a single conducting—non-conducting cycle of the first transistor. Thus, the flow and/or diverting for auxiliary recharge may occur during normal operation of the SMPC. Additionally or alternatively, auxiliary recharge may occur during start-up of the SMPC Consistent with the above, auxiliary recharge during startup—for example once switching has begun, but before the aux winding voltage is sufficiently high, e.g., has reached a threshold,—is desirable.

Further preferably, the flow and/or diverting occur during a PWM switching mode of control of the switching circuit.

There may further be provided the method, wherein the first transistor stores charge to maintain said first transistor on during said diverting said current flow, and preferably during any inhibiting of receiving a bias signal as described above.

There may further be provided the method, wherein a capacitor external to the first transistor stores charge to maintain said first transistor on during said diverting said current flow, and preferably during any inhibiting of receiving a bias signal as described above.

There may further be provided the method, wherein a bias circuit connected to a control line of said first transistor maintains said first transistor on during said diverting said flow of current. Thus, a DC base/gate bias embodiment wherein the above inhibiting does not occur may be provided.

There may further be provided the method, wherein said diverting comprises turning said conduction path on to conduct said current through said conduction path to said charge store. This may comprise turning on a switch in the conduction path or forward biasing a diode in the conduction path. In embodiment, the turning on of the conduction path may in itself allow the diversion of the current flow.

There may further be provided the method, wherein said diverting comprises: decoupling a reference voltage line from said conduction path, to thereby allow flow of said current through said conduction path to said charge store. For example, the diverting may comprise turning the second power switch off to decouple the first power switch from a reference voltage and thereby allow a current flow of the first transistor (e.g., emitter or source current) to be diverted to the charge store. In an embodiment, the decoupling of the first power switch from the reference voltage may cause a voltage change on said first power switch relative to said charge store to thereby allow flow of said current to said charge store, e.g., voltage change on the first power switch forward biases a semiconductor junction diode to allow current flow through the diode to the charge store; alternatively a switch in the conduction path may be used to allow the voltage change.

There may further be provided the method, wherein said decoupling comprises switching said second transistor off while said first transistor is on.

There may further be provided the method, wherein at least the first transistor is a bipolar transistor, e.g., BJT, IGBT, etc., and wherein said diverting comprises diverting emitter current of the bipolar transistor to flow through the conduction path to the charge store.

There may further be provided the method, wherein said at least the first transistor is a field effect transistor (FET), e.g., JFET, MOSFET etc., and wherein said diverting comprises diverting source current of the FET to flow through the conduction path to the charge store. Preferably, the above decoupling of a reference voltage line from the conduction path comprises switching the second transistor off to decouple the FET source terminal from the reference voltage line, the switching the second transistor off occurring while the first transistor is on such that source current of the FET flows to the charge store.

There may further be provided the method, wherein the inductive component is a transformer or coupled inductor, the method preferably further comprising charging said charge store from an auxiliary winding of said transformer or coupled inductor.

There may further be provided the method, wherein said switching controller controls switching of said first transistor.

There may further be provided a storage medium storing computer program instructions to program a programmable processing apparatus to become operable to perform the method.

According to a second development, there is provided a charging circuit for supplying charge to a charge store for providing power to a switching controller of a switch mode power converter (SMPC), the SMPC comprising: an inductive component having a winding coupled to receive power from an input to said SMPC; a switching circuit comprising first and second switching transistors, said first transistor coupled in series between said winding and said second transistor and to receive a winding current wherein said winding current is a current derived from said winding; a switching controller to control switching of said second transistor; and a charge store coupled to provide power to said switching controller, the charging circuit comprising: a current diversion circuit to conduct a said winding current from the first transistor to said charge store; and said second transistor arranged to controllably decouple a reference voltage line from said current diversion circuit to allow said winding current to flow through said current diversion circuit to said charge store.

Similarly as for the first development, the supplying charge to a charge store for providing power to a switching controller of the SMPC preferably occurs during 'normal' operation and/or during start-up.

The current diversion circuit may alternatively be referred to as a conduction path, and/or the charge store may alternatively be referred to as a charge reservoir. Generally, the charge store comprises at least a capacitor.

The second transistor may be a reference decoupling switch operable to substantially turn off to allow voltage change on a terminal of the first transistor (e.g. BJT emitter or MOS source) relative to voltage on the charge store, to thereby allow current flow toward the charge store, in particular where forward-biasing of a diode in the current diversion circuit is required to turn on a conduction path to the store.

There may further be provided the charging circuit, comprising a bias decoupling switch to controllably substantially decouple a control line of said first transistor from a bias output line (preferably an output line of the switching controller), the bias output line for outputting a charge to said first transistor. Thus, the bias line may generally be for controllably supplying charge to the first transistor control terminal. In an embodiment, the bias line is only used to bias the first transistor on for some of the first transistor's on-time, which may not be exactly the same time interval as the second transistor's on-time.

There may further be provided the charging circuit, wherein the first transistor is arranged to store charge for delaying turn-off of the first transistor when the control line of said first transistor is decoupled from the bias output line by said bias decoupling switch such that the first transistor conducts said winding current to said current diversion circuit. The charge control model provides some insight into this charge storage effect. For example, a clear description of BJT switching using the charge control model can be found at http://ecee.colorado.eduhbart/book/book/chapter5/ch5_6.htm; a visual analogy is given in Section 8.10 of Chenming Hu's Modern Semiconductor Devices for Integrated Circuits (http://www.eecs.berkeley.eduhhu/Chenming-Hu_ch8.pdf). Such citations may assist understanding of a BJT charge storage mechanism, the capacitance of which may change with BJT operating conditions. Advantageously, such charge storage by the first transistor for delaying the turn-off is achieved internally or intrinsically in the first transistor (e.g. in the base region of the BJT; in the gate capacitance of MOSFET).

Additionally or alternatively, there may further be provided the charging circuit, wherein a capacitor external to the first transistor is arranged to store the charge for delaying turn-off of the first transistor when the control line of said first transistor is decoupled from the bias output line by said control decoupling switch, or bias decoupling switch, such that the first transistor conducts said winding current to said current diversion circuit. Such a capacitor may be a discrete capacitor and used alone or in conjunction with an internal or intrinsic capacitance of the first transistor for the purpose of delaying the turn-off.

There may further be provided the charging circuit, wherein said current diversion circuit comprises a semiconductor junction, e.g., diode, configured to conduct said diverted winding current when forward-biased.

There may further be provided the charging circuit, wherein said current diversion circuit comprises a switch, e.g., e.g. BJT or MOSFET, operable to turn on to conduct said diverted winding current.

There may further be provided the charging circuit, wherein at least the first transistor is a bipolar transistor, and wherein: said second transistor is operable to decouple the bipolar transistor emitter terminal from the reference voltage line (e.g., a ground rail) while the bipolar transistor is on, to thereby divert emitter current of the bipolar transistor through the current diversion circuit (e.g., comprising a diode and/or a switch) to the charge store.

There may further be provided the charging circuit, wherein at least the first transistor is a field effect transistor (FET, e.g., MOSFET), and wherein: said second transistor is operable to decouple the FET source terminal from the reference voltage line while the FET is on, to thereby divert source current of the FET through the current diversion circuit to the charge store.

There may further be provided an SMPC comprising the charging circuit.

There may further be provided the SMPC, wherein the inductive component comprises a transformer or coupled inductor and said charge store comprises a capacitor configured to receive charge from an auxiliary winding of said transformer or coupled inductor.

The SMPC may be, e.g., a forward, flyback, buck, boost or buck-boost converter.

According to a third development, there is provided a charging circuit for supplying charge to a charge store for providing power to a switching controller of a switch mode power converter (SMPC), the SMPC having: an inductive component having a winding coupled to receive power from an input to said SMPC; a switching circuit comprising first and second switching transistors, said first transistor coupled in series between said winding and said second transistor; a switching controller to control switching of said second transistor; and a charge store to provide power to said switching controller, the charging circuit comprising: means for conducting current from said winding through said first transistor; and means for diverting said current through a conduction path to said charge store.

Similarly as for the first and second developments, the supplying charge to a charge store for providing power to a switching controller of the SMPC preferably occurs during 'normal' operation and/or during start-up.

There may further be provided the charging circuit, the charging circuit comprising means for inhibiting receiving on a control line of said first transistor a bias signal for outputting charge to said first transistor.

There may further be provided the charging circuit, wherein said means for conducting current is for conducting current from said winding through said first transistor during said inhibiting, for example at least as long as the first power switch stays on during any inhibiting as described above.

According to a fourth development, there is provided a storage medium storing code operable to control transistor switching to enable charging of a charge store to power a switching controller of a switch mode power converter (SMPC), the SMPC comprising primary and secondary transistors and a winding, the secondary transistor coupled between the primary transistor and a reference voltage, the code to, when running, control the primary and secondary transistors on to allow conduction of a current from the winding to the reference voltage; then turn off the secondary transistor while allowing the primary transistor to remain on, to thereby allow diverting of current from said primary transistor through a conduction path to a said charge store. In an embodiment, the storage medium may be the switching controller.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A switching control circuit for a switch mode power converter (SMPC), a said SMPC having an inductive component having a winding coupled to receive power from an input to the SMPC, a bipolar transistor coupled to control current flow in the winding, an auxiliary power rail, a charge store for supplying power via the auxiliary rail to a switching control circuit for driving the bipolar transistor, and a bootstrap circuit for bleeding current from the input to the bipolar transistor to thereby provide an amplified current to the charge store, the switching control circuit comprising:
   a base current line for coupling to a base terminal of a said bipolar transistor, an emitter current line for coupling to an emitter terminal of a said bipolar transistor, an auxiliary line for coupling to a said auxiliary power rail, and at least one reference line for coupling to a reference voltage;
   a base current switch configured to controllably couple a base current source to the base current line;
   an emitter current switch configured to controllably couple the emitter current line to a said reference line;
   a bootstrap element for bleeding current from the emitter current line to the auxiliary line, the bootstrap element further operable to block a said current according to a current or voltage bias;
   a base discharge switch configured to controllably bleed current from the base current line to a said reference line; and
   a supplementary base drive line for coupling to a series circuit comprising a supplementary base drive resistor and current control element coupled in series, a said series circuit for bleeding current from a said input to a said base terminal, a said current control element for blocking current flow from a said bootstrap circuit to a said supplementary base drive resistor.

2. Switching control circuit of claim 1, comprising at least one of the said supplementary base drive resistor and current control element coupled to the supplementary base drive line.

3. Switching control circuit of claim 1, wherein the supplementary base drive line is additional to the base current line.

4. Switching control circuit of claim 1, having a package comprising an integrated circuit having the switching control circuit, and comprising at least a said supplementary base drive resistor of a said series circuit, wherein at least the supplementary base drive resistor is external to the package.

5. Switching control circuit of claim 1, wherein the current control element comprises a diode for performing said blocking when a said voltage bias reverse-biases the diode.

6. Switching control circuit of claim 1, wherein the current control element comprises a supplementary base drive switch configured to receive the current or voltage bias as a control signal, the supplementary base drive switch controllable to performing said blocking according to the control signal.

7. Switching control circuit of claim 6, wherein the switching control circuit is configured to synchronise switching of the base current switch and the supplementary base drive switch to turn on simultaneously to allow current flow to the base line.

8. Switching control circuit of claim 6, wherein the switching control circuit is configured to control timing of switching both the base current switch and the supplementary base drive switch based on monitoring the SMPC, preferably wherein said monitoring comprises monitoring a signal on the auxiliary power rail and/or on a terminal of a said bipolar transistor, the switching control circuit thereby operable to regulate output power from a said SMPC.

9. Switching control circuit of claim 1, comprising a charging circuit for supplying charge to the charge store for providing power to a switching controller of the switch mode power converter (SMPC), the SMPC comprising: an inductive component having a winding coupled to receive power from an input to said SMPC; a switching circuit comprising first and second switching transistors, said first transistor coupled in series between said winding and said second transistor and to receive a winding current wherein said winding current is a current derived from said winding; a switching controller to control switching of said second transistor; and a charge store coupled to provide power to said switching controller, the charging circuit comprising: a current diversion circuit to conduct a said winding current from the first transistor to said charge store; and said second transistor arranged to controllably decouple a reference voltage line from said current diversion circuit to allow said winding current to flow through said current diversion circuit to said charge store.

10. A switching control circuit of claim 1, wherein said bleeding current by said series circuit comprises bleeding current from a said input via a said auxiliary power rail.

11. Switch mode power converter (SMPC) comprising the switching control circuit of claim 1, wherein the SMPC is a flyback, forward or boost converter.

12. Method of providing supplementary base drive to a bipolar transistor of a switch mode power converter (SMPC), a said SMPC having an inductive component having a winding coupled to receive power from an input to the SMPC, a bipolar transistor coupled to control current flow in the winding, an auxiliary power rail, a charge store for supplying power via the auxiliary power rail to a switching controller having a base current switch to control current drive to the bipolar transistor, and a bootstrap circuit for bleeding current from the input to the bipolar transistor to thereby provide an amplified current to the charge store, the SMPC having a series circuit comprising a supplementary base drive resistor and a supplementary base drive switch coupled in series, the series circuit for bleeding current from a said input to a base terminal of the bipolar transistor, the supplementary base drive switch for blocking current flow from a said bootstrap circuit to the supplementary base drive resistor,
the method comprising:
turning the base current switch on to allow base current to pass to the bipolar transistor throughout an on time period; and
driving the supplementary base drive switch on for at least part of the on time period, to thereby supplement the base current to thereby drive the bipolar transistor on.

13. The method of claim 12, comprising:
controlling the bipolar transistor off throughout an off time period; and
driving the supplementary base drive switch on for at least part of the off time period, to allow current flow from the auxiliary power rail through the supplementary base current resistor to thereby reduce voltage on the auxiliary power rail.

14. The method of claim 12, comprising monitoring voltage on the auxiliary power rail, and comprising:
enabling said driving the supplementary base drive switch on or at least part of the off time period, when voltage on the auxiliary power rail is above a threshold voltage.

15. The method of claim 13, comprising inhibiting said driving the supplementary base drive switch on for at least part of the off time period, when voltage on the auxiliary power rail is below a threshold voltage.

16. The method of claim 12, comprising a method of providing power to a switching controller of the switch mode power converter (SMPC), the SMPC having:
the inductive component having a winding coupled to receive power from the input to said SMPC;
a switching circuit comprising first and second switching transistors, said first transistor coupled in series between said winding and said second transistor;
the switching controller to control switching of said second transistor; and
the charge store to provide power to said switching controller,
the method comprising:
establishing a flow of current from said winding through said first transistor; and
diverting said current through a conduction path to said charge store.

17. A method of claim 12, wherein said bleeding current by said series circuit comprises bleeding current from a said input via a said auxiliary power rail.

* * * * *